US008542306B2

(12) United States Patent
Aoki et al.

(10) Patent No.: US 8,542,306 B2
(45) Date of Patent: Sep. 24, 2013

(54) IMAGING DEVICE WITH AN OPERATION FOR DISPLAYING A SETTING ARRANGEMENT IN A FIRST DISPLAY UNIT DIFFERENT FROM THE SETTING ARRANGEMENT IN A SECOND DISPLAY UNIT

(75) Inventors: Taizo Aoki, Hyogo (JP); Yuki Ueda, Osaka (JP)

(73) Assignee: Panasonic Corporation, Osaka (JP)

( * ) Notice: Subject to any disclaimer, the term of this patent is extended or adjusted under 35 U.S.C. 154(b) by 424 days.

(21) Appl. No.: 13/063,331

(22) PCT Filed: Sep. 11, 2009

(86) PCT No.: PCT/JP2009/004533
§ 371 (c)(1),
(2), (4) Date: Mar. 10, 2011

(87) PCT Pub. No.: WO2010/029767
PCT Pub. Date: Mar. 18, 2010

(65) Prior Publication Data
US 2011/0164164 A1 Jul. 7, 2011

(30) Foreign Application Priority Data

Sep. 11, 2008 (JP) ................................. 2008-233223

(51) Int. Cl.
*H04N 5/222* (2006.01)
(52) U.S. Cl.
USPC ..................................... 348/333.01; 396/296
(58) Field of Classification Search
USPC ................. 348/333.01–333.11, 341; 396/84, 396/141, 148, 296, 373–375, 383
See application file for complete search history.

(56) References Cited

U.S. PATENT DOCUMENTS 5,640,627 A * 6/1997 Nakano et al. ................. 396/296
8,023,030 B2 * 9/2011 Kosaka ..................... 348/333.03
(Continued)

FOREIGN PATENT DOCUMENTS

| JP | 8-43899 | 2/1996 |
| JP | 11-317899 | 11/1999 |

(Continued)

OTHER PUBLICATIONS

Translation of the International Preliminary Report on Patentability (PCT/IB/338) mailed on May 19, 2011 with PCT/IB/373 & PCT/ISA/237 for corresponding application (PCT/JP2009/004533).

(Continued)

*Primary Examiner* — Nelson D. Hernández Hernández
(74) *Attorney, Agent, or Firm* — Panasonic Patent Center

(57) ABSTRACT

An imaging apparatus is provided with a first display unit, a second display unit, and a controller for controlling displays of setting screens for changing various settings in the first and second display units. The controller controls the displays of the setting screens so that the setting screen displayed on the first display unit differs from the setting screen displayed on the second display unit. The setting screens include an image in which specified setting items and candidates of the setting values related to each setting item are arranged. The controller controls the displays of the setting screens so that the types of displayed setting items and candidates of the setting values are the same in the setting screen displayed on the first display unit and the setting screen displayed on the second display unit, an arranging directions of the setting items are the same, and an arranging directions of the candidates of the setting values differ.

5 Claims, 24 Drawing Sheets

(56) References Cited

U.S. PATENT DOCUMENTS 8,184,198 B2 * 5/2012 Katayama et al. ............ 348/346
8,300,133 B2 * 10/2012 Miyanishi ................ 348/333.01

FOREIGN PATENT DOCUMENTS

| | | |
|---|---|---|
| JP | 2005-173382 | 6/2005 |
| JP | 2005-267446 | 9/2005 |
| JP | 2006-33737 | 2/2006 |
| JP | 2007-195016 | 8/2007 |
| JP | 2007-251752 | 9/2007 |
| JP | 2009-14835 | 1/2009 |

OTHER PUBLICATIONS

International Search Report of PCT Application No. PCT/JP2009/004533, dated Dec. 28, 2009.

* cited by examiner

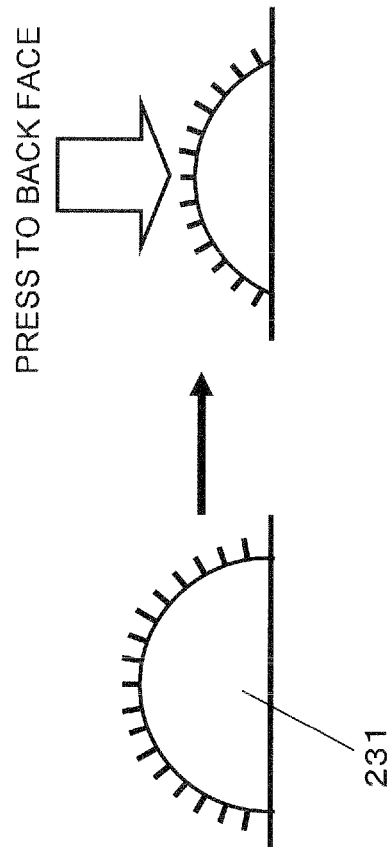
Fig. 3B
Fig. 3A
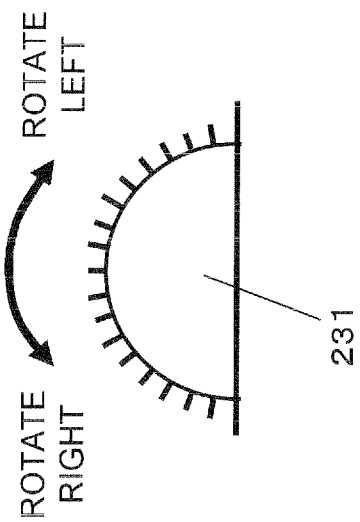
Fig. 3C

Fig. 9A

ELECTRICAL VIEW FINDER

| | | SELECTION OF ITEM | DETERMINATION OF ITEM | SELECTION OF SETTING INFO | DETERMINATION OF SETTING INFO |
|---|---|---|---|---|---|
| DIAL | ROTATE LEFT | O | | O | |
| | ROTATE RIGHT | O | | O | |
| | DETERMINA-TION | | O | | O |
| CROSS CURSOR KEY | UP | | | | |
| | DOWN | | | | |
| | LEFT | | | | |
| | RIGHT | | | | |
| | CENTER | | | | |

Fig. 9B

LCD MONITOR

| | | SELECTION OF ITEM | DETERMINATION OF ITEM | SELECTION OF SETTING INFO | DERMINATION OF SETTING INFO |
|---|---|---|---|---|---|
| DIAL | ROTATE LEFT | | | | |
| | ROTATE RIGHT | | | | |
| | DETERMINA-TION | | | | |
| CROSS CURSOR KEY | UP | | O | O | |
| | DOWN | | | O | |
| | LEFT | O | | | |
| | RIGHT | O | | | |
| | CENTER | | | | O |

Fig. 15A
FIRST MODE

| | | SELECTION OF ITEM | DETERMINATION OF ITEM | SELECTION OF SETTING INFO | DETERMINATION OF SETTING INFO |
|---|---|---|---|---|---|
| DIAL | ROTATE LEFT | ○ | | ○ | |
| | ROTATE RIGHT | ○ | | ○ | |
| | DETERMINA-TION | | ○ | | ○ |
| CROSS CURSOR KEY | UP | | | | |
| | DOWN | | | | |
| | LEFT | | | | |
| | RIGHT | | | | |
| | CENTER | | | | |

Fig. 15B
SECOND MODE

| | | SELECTION OF ITEM | DETERMINATION OF ITEM | SELECTION OF SETTING INFO | DETERMINATION OF SETTING INFO |
|---|---|---|---|---|---|
| DIAL | ROTATE LEFT | | | | |
| | ROTATE RIGHT | | | | |
| | DETERMINA-TION | | | | |
| CROSS CURSOR KEY | UP | | ○ | ○ | |
| | DOWN | | | ○ | |
| | LEFT | ○ | | | |
| | RIGHT | ○ | | | |
| | CENTER | | | | ○ |

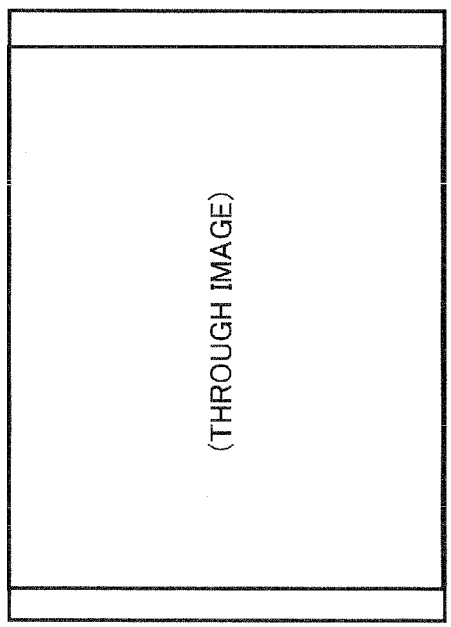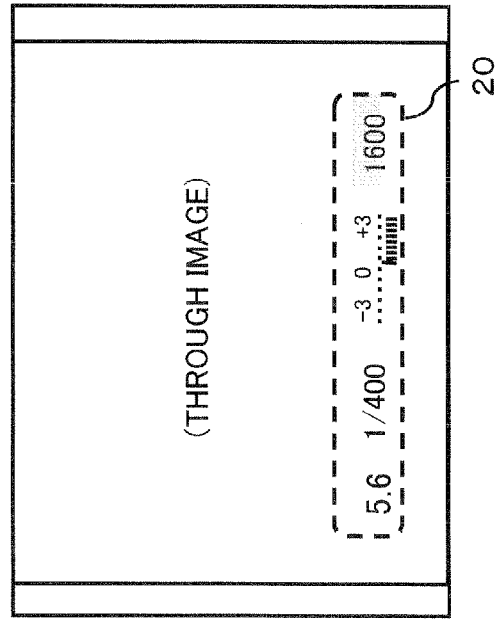
Fig. 20A
Fig. 20B

Fig. 21

|  |  | SELECTION OF ITEM | DETERMINATION OF ITEM | SELECTION OF SETTING INFO | DETERMINATION OF SETTING INFO |
|---|---|---|---|---|---|
| DIAL | ROTATE LEFT | ○ |  | □ |  |
| DIAL | ROTATE RIGHT | ○ |  | □ |  |
| DIAL | DETERMINATION |  | ○ |  | □ |
| CROSS CURSOR KEY | UP |  | ○ | △ |  |
| CROSS CURSOR KEY | DOWN |  |  | △ |  |
| CROSS CURSOR KEY | LEFT | ○ |  |  |  |
| CROSS CURSOR KEY | RIGHT | ○ |  |  |  |
| CROSS CURSOR KEY | CENTER |  |  |  | △ |

□ ··· WHEN THE DIAL KEY IS OPERATED TO DETERMINE THE SETTING ITEM

△ ··· WHEN THE CURSOR KEY IS OPERATED TO DETERMINE THE SETTING ITEM

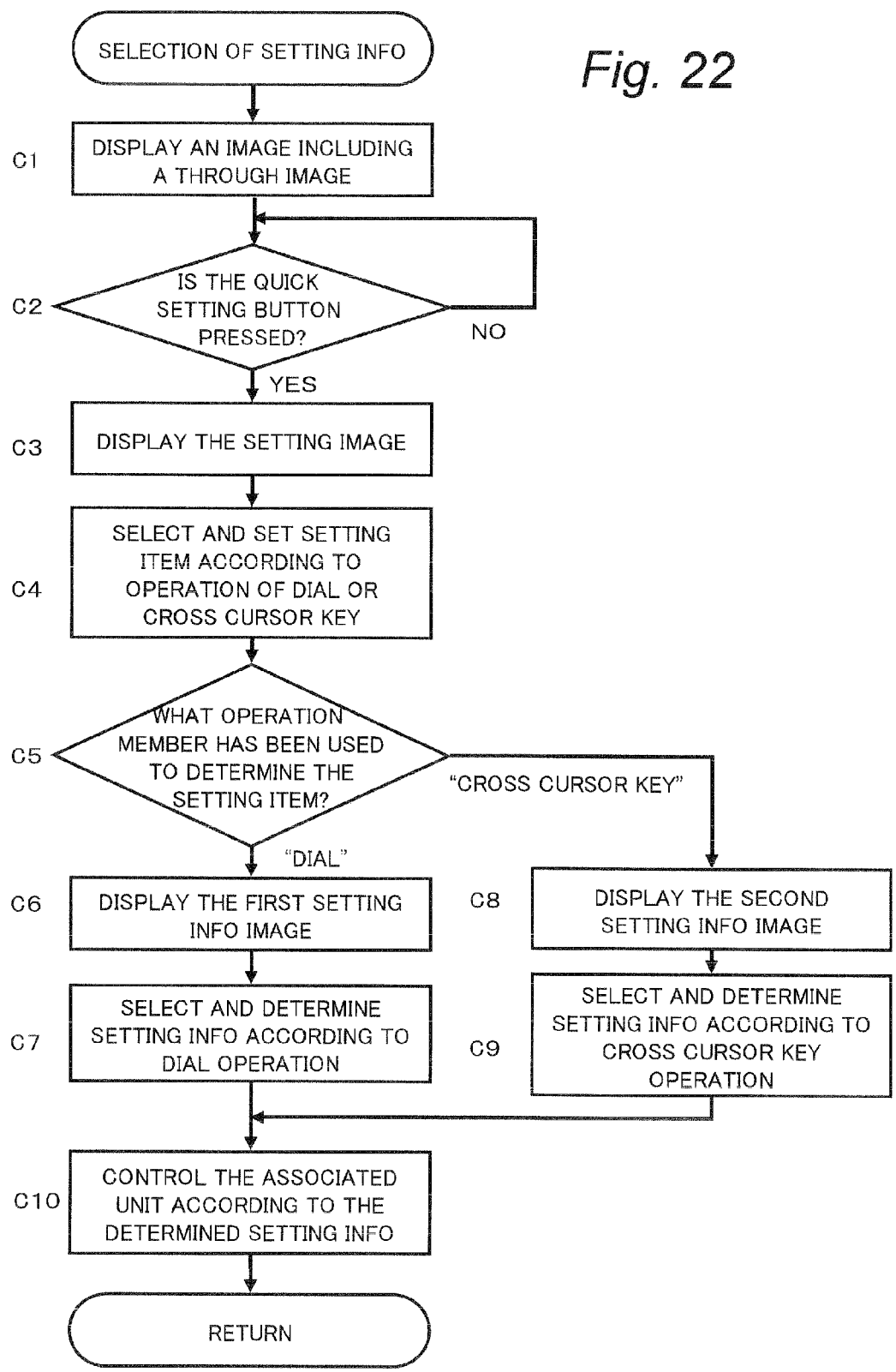

Fig. 24

(FIRST MODE)

| | | SELECTION OF ITEM | DETERMINATION OF ITEM | SELECTION OF SETTING INFO | DETERMINATION OF SETTING INFO |
|---|---|---|---|---|---|
| DIAL | ROTATE LEFT | ○ | | ○ | |
| | ROTATE RIGHT | ○ | | ○ | |
| | DETERMINATION | | ○ | | ○ |
| CROSS CURSOR KEY | UP | | | | |
| | DOWN | | | | |
| | LEFT | ○ | | ○ | |
| | RIGHT | ○ | | ○ | |
| | CENTER | | ○ | | ○ |

(SECOND MODE)

| | | SELECTION OF ITEM | DETERMINATION OF ITEM | SELECTION OF SETTING INFO | DETERMINATION OF SETTING INFO |
|---|---|---|---|---|---|
| DIAL | ROTATE LEFT | | | | |
| | ROTATE RIGHT | | | | |
| | DETERMINATION | | | | |
| CROSS CURSOR KEY | UP | | ○ | ○ | |
| | DOWN | | | ○ | |
| | LEFT | ○ | | | |
| | RIGHT | ○ | | | |
| | CENTER | | | | ○ |

IMAGING DEVICE WITH AN OPERATION FOR DISPLAYING A SETTING ARRANGEMENT IN A FIRST DISPLAY UNIT DIFFERENT FROM THE SETTING ARRANGEMENT IN A SECOND DISPLAY UNIT

TECHNICAL FIELD

The present invention relates to an imaging apparatus that captures an image to generate image data, and more particularly, to an imaging apparatus that includes display units and can display a setting screen for making various settings on the display units.

BACKGROUND ART

A user can make various settings on an imaging apparatus such as a video camera or a digital still camera. Normally, the settings are made using a setting screen displayed on a display unit of the imaging apparatus.

For example, Patent Document 1 discloses an imaging apparatus (video camera) that enables to make settings on the imaging apparatus with a setting screen displayed on a display unit and referred to. The imaging apparatus in Patent Document 1 includes a manual adjusting unit (operation unit) which is provided on a camera body to be capable of ejecting from the camera body and a viewfinder that displays an image captured by a CCD and a setting screen for making settings. The manual adjusting unit includes a dial which is operated by pushing and rotating. A user can speedily and easily manipulate various manual adjustments (brightness, autofocus, and so on.) and a menu selection by operating the dial, while looking through the viewfinder.

Meanwhile, there exists an imaging apparatus that includes a plurality of display units. For example, there is an imaging apparatus that includes, as a display unit, not only a viewfinder but also a liquid crystal display (LCD). In light of user convenience, it is considered to be preferable that such an imaging apparatus including a plurality of display units is configured to make settings on both of the display units, i.e., the viewfinder and the liquid crystal display, using a setting screen.

PRIOR ART DOCUMENT

Patent Document

Patent Document 1: JP08-043899

DISCLOSURE OF INVENTION

Problems to be Solved by the Invention

However, the viewfinder and the LCD monitor have different usability. Thus, making settings using the same operation member and the same setting screen on the different display units does not always provide better usability for users.

The present invention is made in view of the above-described problem, an object is to provide an imaging apparatus that provides excellent usability for users in performing a setting operation on the imaging apparatus.

Means for Solving the Problems

An imaging apparatus according to the invention includes a first display unit, a second display unit, and a controller that controls display of setting screens for changing various settings which are provided on the first and second display units. The controller controls the display of setting screens so that a setting screen displayed on the first display unit differs from a setting screen displayed on the second display unit. The setting screen includes an image in which predetermined setting items and candidates for setting values for the respective setting items are arranged. The controller controls the display of setting screens so that, types of setting item and candidate for setting value to be displayed are the same between the setting screen displayed on the first display unit and the setting screen displayed on the second display unit, and that an arranging direction of the setting item is the same in the setting screen displayed on the first display unit and the setting screen displayed on the second display unit, but an arranging direction of the candidate for setting value differs between the setting screen displayed on the first display unit and the setting screen displayed on the second display unit.

Effect of the Invention

According to the present invention, a setting information image which is displayed when one piece of setting information is selected from among a plurality of pieces of setting information varies according to a display unit that displays images during an operation. Accordingly, an imaging apparatus with excellent usability can be provided that enables a user to perform a more intuitive operation in an information selection operation according to a display unit.

BRIEF DESCRIPTION OF DRAWINGS

FIGS. 3A to 3C are views for describing the operations of a dial and a cross cursor key according to the first embodiment of the present invention.

FIGS. 9A and 9B are diagrams for describing assignment of operations to the operations of operation members according to the first embodiment of the present invention.

FIGS. 15A and 15B are diagrams for describing assignment of operations to the operations of operation members according to a second embodiment of the present invention.

FIGS. 20A and 20B are views showing examples of displayed images according to the second embodiment of the present invention.

FIG. 21 is a diagram for describing assignment of operations to the operations of operation members according to a third embodiment of the present invention.

FIG. 22 is a flowchart for describing an exemplary operation of a digital camera 1 according to the third embodiment of the present invention.

FIG. 24 is a diagram for describing assignment of operations to the operations of operation members according to other embodiments.

MODE FOR CARRYING OUT THE INVENTION

Embodiments of the present invention are described below with reference to the drawings. In the following, examples in which the ideas of the present invention are applied to a digital camera are described.

First Embodiment

1. Configuration
1-1 Configuration of Digital Camera

Figure 1:
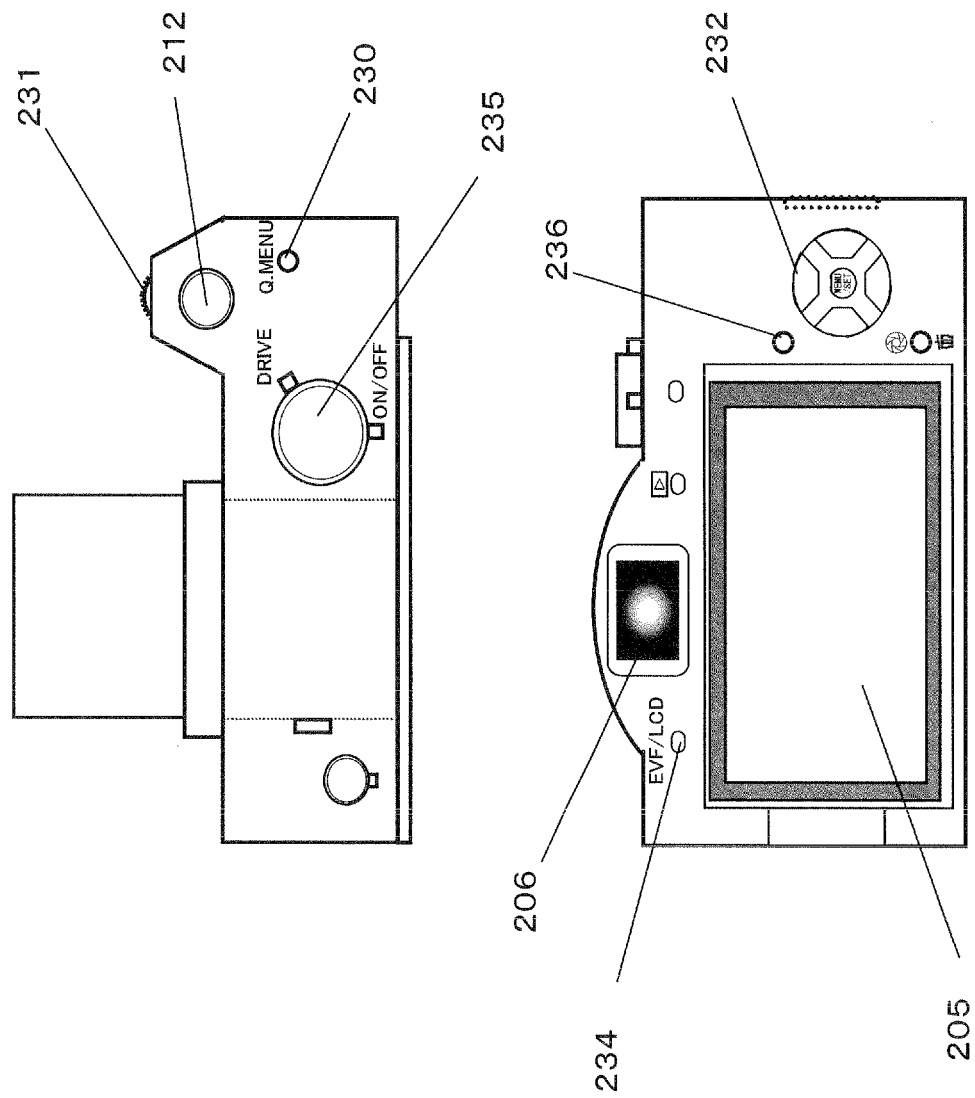
FIG. 1 is a top view and a rear view of a digital camera according to a first embodiment of the present invention.
Figure 2:
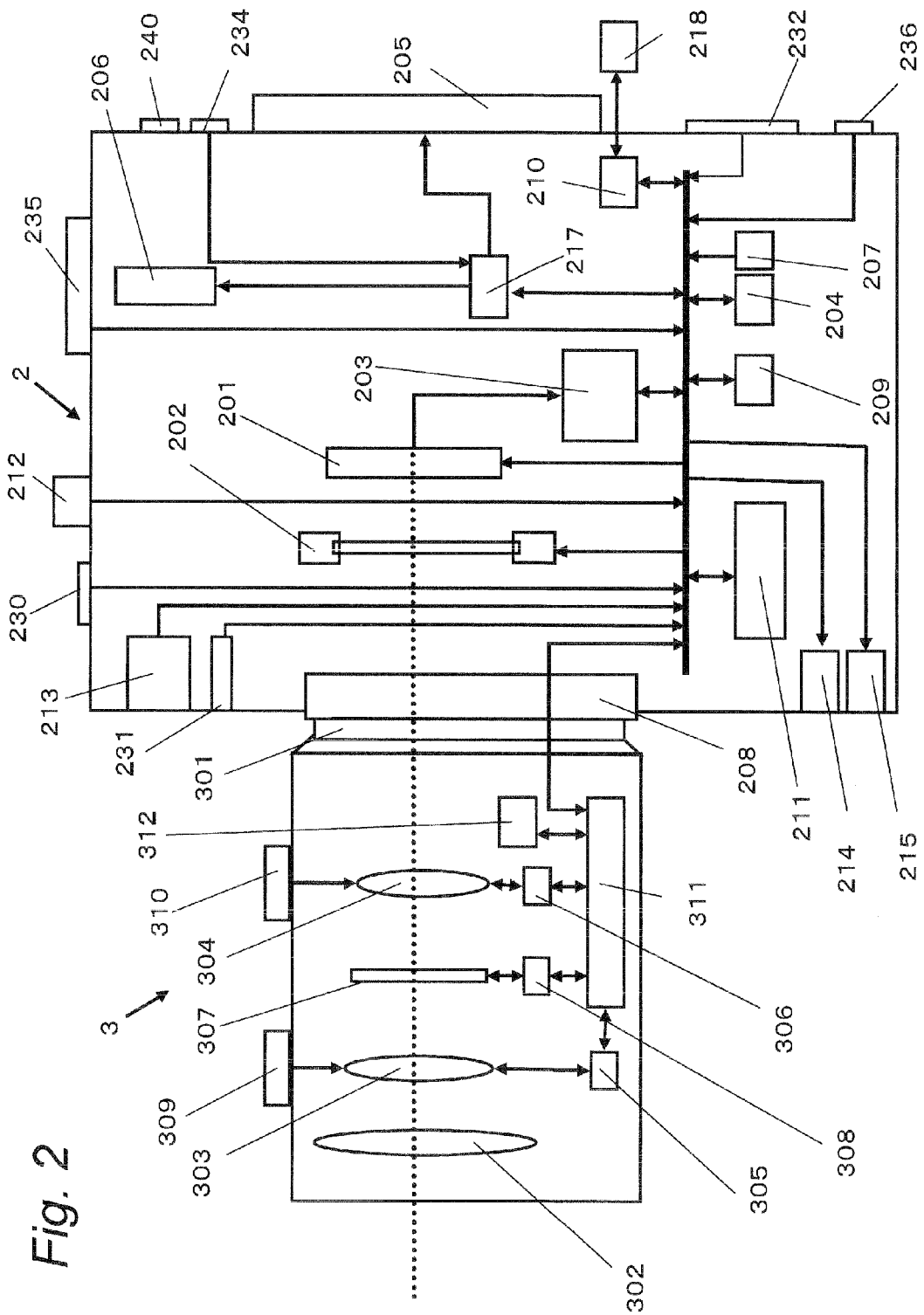
FIG. 2 is a block diagram of the digital camera according to the first embodiment of the present embodiment.

FIG. 1 is an external view of a digital camera 1 of the present embodiment. FIG. 2 is a configuration diagram of the digital camera 1 of the present embodiment.

As shown in FIG. 1, the digital camera 1 of the present embodiment includes a camera body 2 and an interchangeable lens 3 which is mountable to the camera body 2.

As shown in FIG. 2, the camera body 2 includes a CMOS sensor 201, a shutter 202, a signal processing processor 203 (DSP), a buffer memory 204, a liquid crystal display (LCD) monitor 205, an electronic viewfinder 206 (EVF), a power supply 207, a body mount 208, a flash memory 209, a card slot 210, a CPU 211, a shutter switch 212, an electronic flash 213, a microphone 214, a speaker 215, a quick setting button 230, a dial 231, and a cross cursor key 232.

The interchangeable lens 3 includes a lens mount 301, a lens system including a zoom lens 303 and a focus lens 304, a zoom driver 305 that drives the zoom lens 303, a focus driver 306 that drives the focus lens 304, a diaphragm 307, a diaphragm driver 308 that drives the diaphragm 307, a zoom ring 309, a focus ring 310, a lens controller 311 that accepts instructions from the camera body 2, and a flash memory 312. The configurations of the camera body 2 and the interchangeable lens 3 are described in more detail below.

1-2 Configuration of Camera Body

The camera body 2 is configured to capture a subject image collected by the lens system of the interchangeable lens 3 and record the subject image as image data.

The CMOS sensor 201 includes a light-receiving element, an AGC (gain control amplifier), and an AD converter. The light-receiving element converts an optical signal collected by the lens system into an electrical signal to generate image data. The AGC amplifies an electrical signal outputted from the CMOS sensor 201. The AD converter converts an analog electrical signal outputted from the CMOS sensor 201 into a digital signal. The CMOS sensor 201 performs various operations such as exposure, transfer, and an electronic shutter, according to control signals received from the CPU 211.

The mechanical shutter 202 switches between passage and non-passage of an optical signal incident through the lens system, toward/through the CMOS sensor 201.

The signal processing processor 203 (DSP) performs predetermined image processing on image data which is a digital signal converted by the AD converter. The predetermined image processing includes gamma conversion, YC conversion, an electronic zoom process, a compression process, a decompression process, and the like, but is not limited thereto.

The buffer memory 204 functions as a work memory when the signal processing processor 203 performs a process and when the CPU 211 performs a control process. The buffer memory 204 can be for example, a DRAM.

The LCD monitor 205 is disposed on the back of the camera body 2 and can display image data that is generated by the CMOS sensor 201 or image data that is subjected to a predetermined process on the image data generated by the CMOS sensor 201. An image signal to be inputted to the LCD monitor 205 is converted by a DA converter from a digital signal to an analog signal when the image signal is outputted to the LCD monitor 205 from the signal processing processor 203 or the CPU 211.

The electronic viewfinder 206 is disposed inside the camera body 2 and can display image data that is generated by the CMOS sensor 201 or image data that is subjected to a predetermined process on the image data generated by the CMOS sensor 201. The electronic viewfinder 206 includes a liquid crystal display, a diopter adjustment lens and the like. Note that an image signal to be inputted to the electronic viewfinder 206 is similarly converted by the DA converter from a digital signal to an analog signal when the image signal is outputted to the electronic viewfinder 206 from the signal processing processor 203. Since the electronic viewfinder 206 is disposed inside the camera body 2, a user can visually recognize an image displayed on the electronic viewfinder 206 by looking through the camera body 2.

The LCD monitor 205 and the electronic viewfinder 206 are switched by a display switching unit 217 such that an image is displayed on either one of the LCD monitor 205 and the electronic viewfinder 206. Specifically, the configuration is such that while an image is displayed on the LCD monitor 205, no image is displayed on the electronic viewfinder 206, and while an image is displayed on the electronic viewfinder 206, no image is displayed on the LCD monitor 205. The display switching unit 217 (see FIG. 1) can be realized by a physical member and corresponds to a selection switch 234 (see FIG. 2). The display switching unit 217 (selection switch 234) switches electrical connection such that either one of the LCD monitor 205 and the electronic viewfinder 206 is electrically connected to the signal processing processor 203. That is, by the selection switch 234, a display unit that displays images can be switched between the LCD monitor 205 and the electronic viewfinder 206. Note that the configuration is not limited to the above-described example and switching of display between the LCD monitor 205 and the electronic viewfinder 206 may be performed based on a control signal from the CPU 211 and the like.

As described above, it is configured to perform switching between display on the LCD monitor and display on the electric viewfinder. Note, however, that this is one example and thus display on the LCD monitor and display on the electronic viewfinder may be performed simultaneously. Here, in the case of simultaneous display, an image displayed on the LCD monitor may be the same as, or different from, an image displayed on the electronic viewfinder.

A battery 207 supplies power to drive the digital camera 1. The battery 207 may be, for example, a dry battery or a rechargeable battery. Alternatively, instead of the battery 207, power which is supplied externally through a cord may be supplied to the digital camera 1, as a power supply.

The body mount 208 is a member that enables attachment and detachment of the interchangeable lens 3, together with the lens mount 301 of the interchangeable lens 3.

The flash memory 209 is a storage medium used as a built-in memory. The flash memory 209 can store image data or image data that is obtained by performing a predetermined process on the image data.

In addition, the flash memory 209 can store item images and setting information images. Furthermore, the flash memory 209 can store programs for control of the CPU 211, setting values and the like.

The card slot 210 is a slot for inserting and removing a memory card 218 which can store image data and the like.

The CPU 211 performs overall control of the camera body 2. The CPU 211 may be realized by a microcomputer or a hard-wired circuit. That is, the CPU 211 performs various controls.

The shutter switch 212 is a button provided on a top surface of the camera body 2, and detects half-press and full-press operations performed by the user. When the shutter switch 212 receives a half-press operation performed by the user, the shutter switch 212 outputs a half-press signal to the CPU 211. On the other hand, when the shutter switch 212 receives a full-press operation from the user, the shutter switch 212 outputs a full-press signal to the CPU 211. Based on these signals, the CPU 211 performs various controls.

The quick setting button 230 is provided on the top surface of the camera body 2. When the quick setting button 230 is pressed by the user, the quick setting button 230 sends an operation signal to the CPU 211. The quick setting button 230 is a button used for instructing a display of an image (item image), which enables settings to be made for various setting items of the digital camera 1, on the LCD monitor 205 or the electronic viewfinder 026. When the quick setting button 230 is pressed, a quick menu which is displayed and superimposed on a through image is displayed on the LCD monitor 205 or the electronic viewfinder 206.

The dial 231 is an operation member provided at a grip portion of the camera body 2 (see FIG. 1). As shown in FIG. 3A, the dial 231 can be rotated in a left-right direction of the camera body 2. In addition, as shown in FIG. 3B, the dial 231 can be pressed into a back of the camera body 2. When the dial 231 is operated by the user, the dial 231 sends an operation signal to the CPU 211 according to the operation. Specifically, when the dial 231 is rotated left, the dial 231 sends an operation signal indicating "a left rotation". When the dial 231 is rotated right, the dial 231 sends an operation signal indicating "a right rotation". Furthermore, when the dial 231 is pressed (pushed) into the back of the digital camera, the dial 231 sends an operation signal indicating "press".

The cross cursor key 232 is an operation member provided on the back of the camera body 2 (see FIG. 1). As shown in FIG. 3C, the cross cursor key 232 has four keys 23a to 23d disposed on the left, right, top, and bottom sides. The cross cursor key 232 further has a center key 23e disposed at the center of the left, right, up, and down keys 23a to 23d. Each of the keys 23a to 23e is made of a member disposed on the top of a switching device. A pressing of each key 23a to 23e is detected by the member being operated. When any one of the five keys 23a to 23e is pressed, the cross cursor key 232 sends an operation signal to the CPU 211. Specifically, when the up key 23a disposed on an up side is pressed, an operation signal indicating the up side is sent. Similarly, when the down key 23b disposed on a down side is pressed, an operation signal indicating the down side is sent. When the left key 23c disposed on a left side is pressed, an operation signal indicating the left side is sent. When the right key 23d disposed on a right side is pressed, an operation signal indicating the right side is sent. When the center key 23e is pressed, an operation signal indicating "setting" is sent to the CPU 211. Note that the member(s) provided on the top of the switching devices for the respective keys 23a to 23d of the cross cursor key 232 may be a single member that receives operations for the left, right, up, and down directions, or may be configured by different members for the left, right, up, and down directions and accept operations for the respective directions. In the present embodiment, different members are provided corresponding to the respective keys 23a to 23e.

The camera body 2 includes a mode switching dial 235. The mode switching dial 235 is formed in a substantially circular shape, and is configured to be able to select one of a plurality of control modes by the user rotating the mode switching dial 235. That is, in order to select one of the plurality of control modes, the mode switching dial 235 is configured to detect rotation positions of the mode switching dial 235 corresponding to the respective control modes. The plurality of control modes include "still image recording mode", "moving image recording mode", "playback mode", and the like. For example, when a symbolic image representing the "still image recoding mode" which is provided on a top surface of the mode switching dial 235 is moved to a predetermined position (selected position), the mode switching dial 235 outputs to the CPU 211 a mode switching signal indicating that the mode has been changed to the "still image shooting mode". With this, switching of control modes can be detected.

1-3 Configuration of Interchangeable Lens

The lens system includes the zoom lens 303, the focus lens 304, and an objective lens 302 to collect light from a subject. The zoom lens 303 is driven by the zoom driver 305 or the zoom ring 309 to adjust zoom magnification. The focus lens 304 is driven by the focus driver 306 or the focus ring 310 to adjust focus. In a word, the focus lens 304 and the zoom lens 303 are movable lenses. The interchangeable lens 3 is the same as that in conventional art and thus description thereof is omitted.

2. Item Image and Setting Information Image

In the present embodiment, an item image and a setting information image for making various settings on the digital camera are displayed on the LCD monitor 205. The user can make various settings, such as a recording condition, on the digital camera 1 by operating an operation member (the dial 231 or the cross cursor key 232) with an item image or a setting information image being displayed.

The item image is an image in which a plurality of setting items are displayed. The setting items include, for example, shutter speed, aperture value, ISO rating, white balance, AF area, number of recordable images, a metering method (center-weighted metering, selective area metering, and the like), and an electronic flash control method, but are not limited thereto. An item image is displayed on the LCD monitor 205 or the electronic viewfinder 206 and one of a plurality of setting items is selected according to an operation performed by the user on the dial 231 or the cross cursor key 232.

Figure 4A:
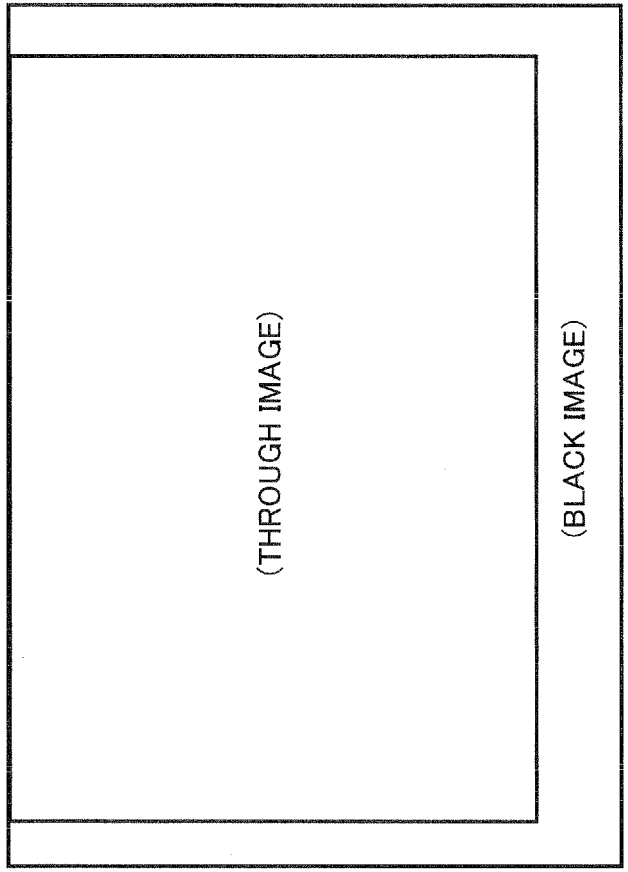
FIGS. 4A and 4B are views showing examples of displayed images according to the first embodiment of the present invention.
Figure 4B:
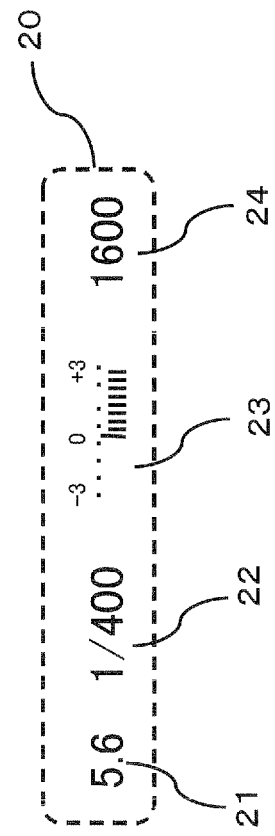
Figure 5:
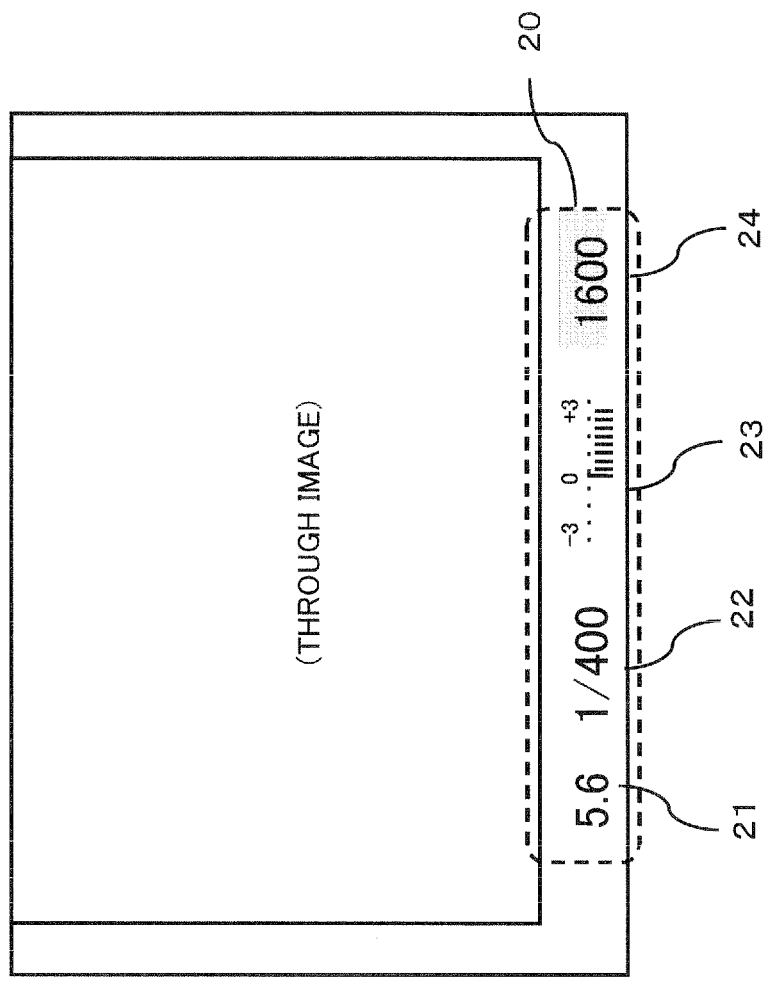
FIG. 5 is a view showing an example of a displayed image according to the first embodiment of the present invention.

FIG. 4B shows an example of the item image. An item image 20 includes a plurality of setting items 21 to 24. In FIG. 4B, an aperture value 21, a shutter speed 22, an exposure correction value 23, and an ISO rating 24 are displayed as setting items. The user can select one of the plurality of setting items 21 to 24 shown in the item image 20, by operating the operation member. On the LCD monitor 205 and the electronic viewfinder 206, the item image 20 (see FIG. 4B) is superimposed and displayed on an image including a through image (see FIG. 4A). FIG. 5 shows an example in which the item image 20 is superimposed and displayed on the image including a through image. As shown in FIG. 5, in the item image 20, the item selected by the user is displayed in a different color (for example, gray) from a color of not-selected items.

Figure 6:
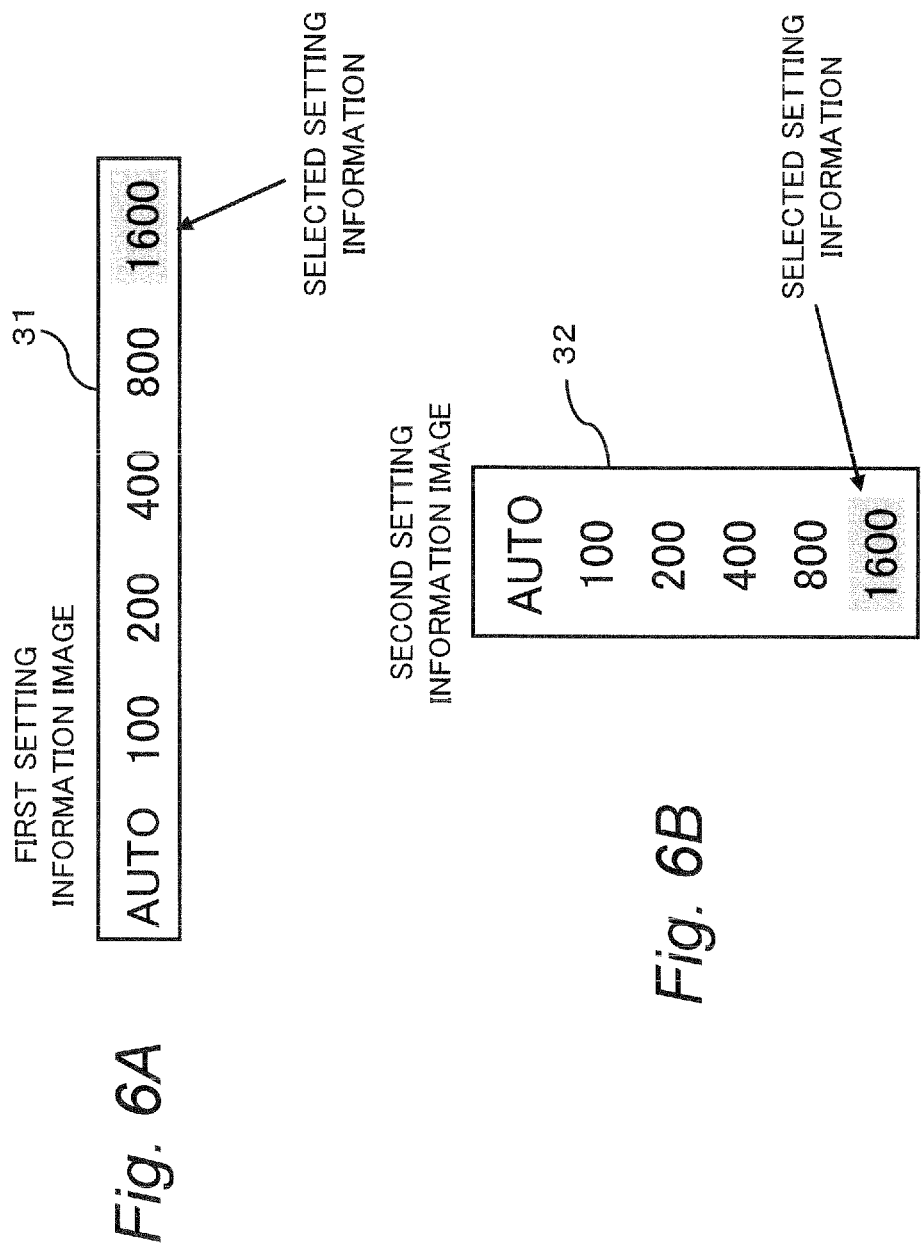
FIGS. 6A and 6B are views for showing respectively a first setting information image and a second setting information image according to the first embodiment of the present invention.
Figure 7:
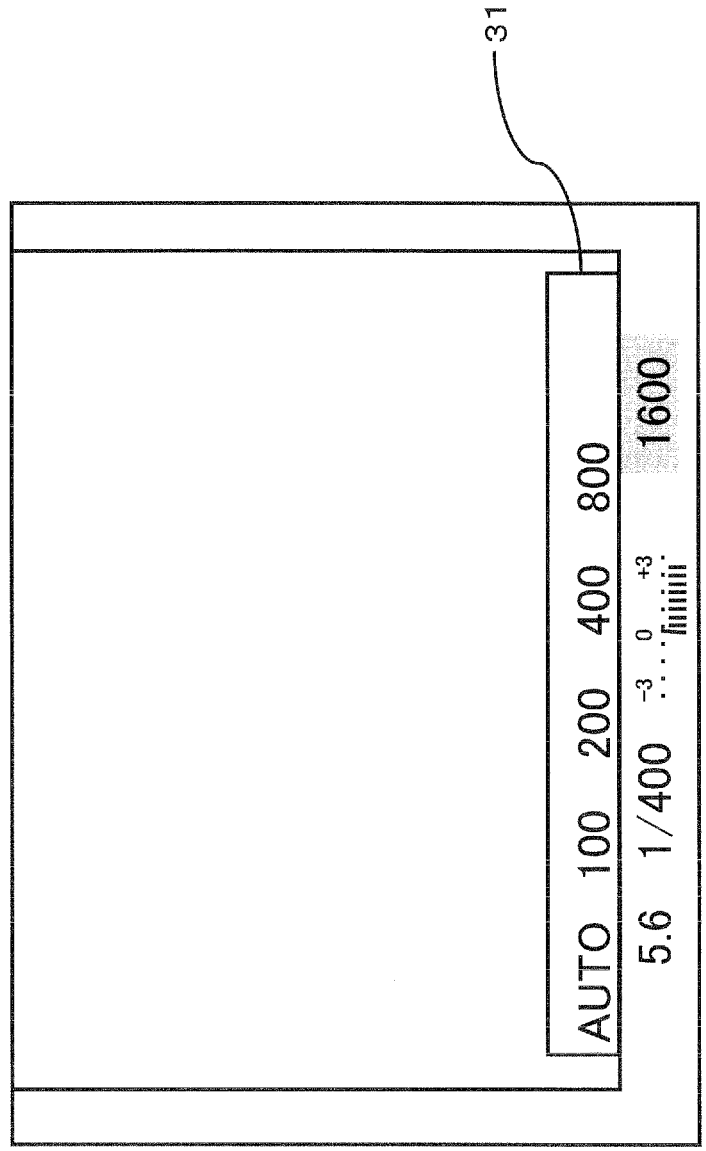
FIG. 7 is a view showing an example of a displayed image according to the first embodiment of the present invention.
Figure 8:
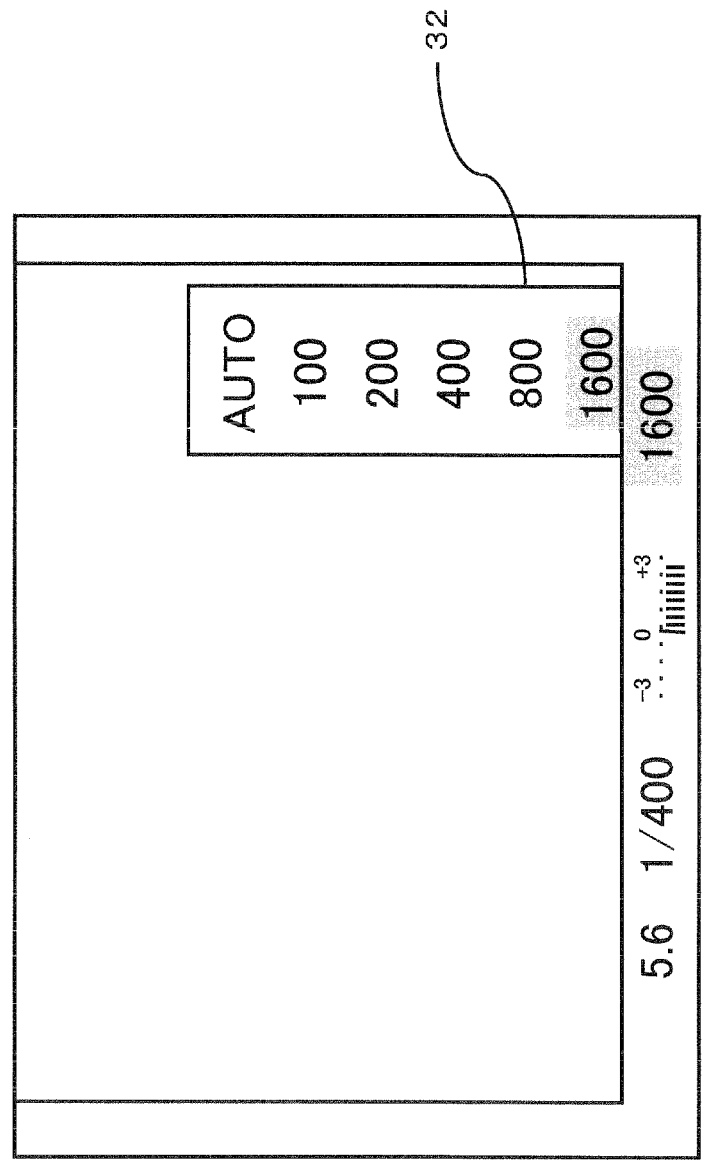
FIG. 8 is a view showing an example of a displayed image according to the first embodiment of the present invention.

The setting information image includes a plurality of pieces of setting information for the respective setting items. FIGS. 6A and 6B show examples of the setting information image. Setting information images 31 and 32 in FIGS. 6A and 6B show a plurality of setting values for a setting item for ISO rating. FIGS. 6A and 6B, as an example of the setting values of ISO rating, "AUTO", "100", "200", "400", "800", and "1600" are shown so that one of than can be selected. The CPU 211 of the camera body 2 selects and determines one of the plurality of pieces of setting information (setting values) shown in the setting information images 31 and 32, according to an operation performed by the user with the operation member. The setting information image includes the first setting information image 31 as shown in FIG. 6A and the second setting information image 32 as shown in FIG. 6B. In the first setting information image 31, a plurality of pieces of setting value information are arranged in a left-right direction (horizontal direction) on the electronic viewfinder 206 and the LCD monitor 205. In the second setting information image 32, a plurality of pieces of setting value information are arranged in an up-down direction (vertical direction). FIG. 7 shows exemplary display of the first setting information image 31 for a setting item for ISO rating, and FIG. 8 shows exemplary display of the second setting information image 32 for a setting item for ISO rating. In the setting information images 31 and 32, setting information selected by the user and setting information not selected are displayed in different display methods (for example, color). For example, the selected setting information is displayed in gray.

Note that image data of item images and setting information images are stored in the flash memory 209, and the CPU 211 reads image data of an item image and a setting information image from the flash memory 209 and displays the read image data on the LCD monitor 205 or the electronic viewfinder 206.

3. Operation 3.1 Outline of Operation of Digital Camera

The digital camera 1 of the present embodiment is configured to switch an operation member which is available, according to a display unit which is used. FIGS. 9A and 9B show the relationship between display units to be used and available operation members. When the digital camera 1 is set such that images are displayed on the electronic viewfinder 206, as shown in FIG. 9A, the digital camera 1 makes selection and determination of an item and setting information according to an operation on the dial 231. On the other hand, when the digital camera 1 is set such that images are displayed on the LCD monitor 205, as shown in FIG. 9B, the digital camera 1 makes selection and determination of an item and setting information according to an operation on the cross cursor key 232.

An outline of an operation for the case of a setting where images (an item image, a setting information image, and the like) are displayed on the electronic viewfinder 206, and an operation for the case of a setting where images are displayed on the LCD monitor 205 is described below. Note that such settings can be switched by the selection switch 234.

First, the case is described in which the digital camera 1 is set such that images are displayed on the electronic viewfinder 206. As shown in FIG. 9A, when images are displayed on the electronic viewfinder 206, the available operating member is set to the dial 231.

The digital camera 1 displays an item image 20 for selecting a setting item on the electronic viewfinder 206. In this state, when an operation is performed by the user on the dial 231, the CPU 211 selects one of a plurality of setting items 21 to 24 shown in the item image 20 according to the operation. The CPU 211 displays a setting information image related to the selected setting item on the electronic viewfinder 206. In the present embodiment, when operating member is set to the dial 21, a first setting information image 31 is displayed in which a plurality of pieces of setting information related to setting items are arranged in the left-right direction of the camera body 2. When the first setting information image 31 is displayed, the CPU 211 selects one of the plurality of pieces of setting information according to an operation in the left-right direction performed by the user on the dial 231. The CPU 211 makes a setting using the selected setting information.

Next, the case is described in which the digital camera 1 is set such that images are displayed on the LCD monitor 205. As shown in FIG. 9B, when images are displayed on the LCD monitor 205, the operating member is set to the cross cursor key 232.

The digital camera 1 displays an item image 20 on the LCD monitor 205. In this state, when an operation is performed by the user on the cross cursor key 232, the CPU 211 selects one of a plurality of setting items in the item image according to the operation. The CPU 211 displays a setting information image related to the selected setting item on the LCD monitor 205. In the present embodiment, when the operation member is set to the cross cursor key 232, a second setting information image 32 is displayed in which a plurality of pieces of setting information related to setting items are arranged in the up-down direction of the camera body 2. When the second setting information image 32 is displayed, the CPU 211 selects one of the plurality of pieces of setting information according to an operation in the up-down direction performed by the user on the cross cursor key 732. The CPU 211 makes a setting using the selected setting information.

As described above, the present embodiment switches the operation member (the dial 231 and the cross cursor key 232) according to a display unit to be used for image display (the electronic viewfinder 206 or the LCD monitor 205), and switches the setting information image to be displayed on the display unit according to the operation member. That is, according to a display unit to be used for image display (the electronic viewfinder 206 or the LCD monitor 205), the setting information image to be displayed on the display unit is switched.

Generally, when an image displayed on the electronic viewfinder 206 is viewed, the user needs to bring his/her face close to the camera body 2. In such a state, the dial 231 is more convenient for the user than the cross cursor key 232. Thus, when the electronic viewfinder 206 is used, the dial 231 is set as the operation member. Furthermore, since the operation direction of the dial 231 is the left-right direction, the first setting information image 31 is displayed so that the operation direction coincides with the selection direction of a setting item or setting information. On the other hand, when the LCD monitor 205 is used, the user can view an image without bringing his/her face close to the camera body 2. Thus, when the LCD monitor 205 is used, the cross cursor key 232 having a higher flexibility than the dial 231 is set as the operation member, and the second setting information image 32 is displayed so that the operation direction in the up-down direction of the cross cursor key 232 coincides with the selection direction of a setting item and the like.

As described above, changing of the operation member according to the display unit allows an operation member with better usability to be set, and displaying of a setting information image in which the selection direction coincides with the operation direction of the operation member allows an intuitive operation by the user to be achieved, so that user convenience in operation of changing the settings can be improved.

3.2 Detailed Operation of Digital Camera

A detailed operation of the digital camera 1 during a setting operation is described with reference to a flowchart of FIG. 10. In the following, an exemplary operation for the case in which the digital camera 1 is set to "still image recording mode" is described. In addition, an operation for the case of a setting where images are displayed on the electronic viewfinder 206 and an operation for the case of a setting where images are displayed on the LCD monitor 205 is described, respectively.

3.2.1 Case of Setting where Images are Displayed on Electronic Viewfinder

First, an operation of selecting/determining a setting item and setting information for the case of a setting where images are displayed on the electronic viewfinder 206 is described.

The CPU 211 displays, as a through image, image data generated by the CMOS sensor 201 on the electronic viewfinder 206. Specifically, the CPU 211 sequentially displays image data which is sequentially generated by the CMOS sensor 201, on the electronic viewfinder 206 (see FIG. 4A).

When the CPU 211 receives an operation signal from the quick setting button 230 (A1), the CPU 211 superimposes an item image 20 as shown in FIG. 40 on an image including a through image (A2) and displays it on the electronic viewfinder 206 (see FIG. 5). Note that an independent display member may be provided below the liquid crystal display of the electronic viewfinder 206, and the item image 20 may be displayed on the display member.

The CPU 211 determines whether a member to be operated, when one item and one piece of setting information are selected from a plurality of setting items and a plurality of pieces of setting information, is the dial 231 or the cross cursor key 232 (A3). Since the setting is made such that images are displayed on the electronic viewfinder 206, the member to be operated is the dial 213. Note that although in step A3 it is determined whether the member to be operated is the dial 231 or the cross cursor key 232, it may be determined whether a display unit for images is the electronic viewfinder 206 (corresponding to the dial 231) or the LCD monitor 205 (corresponding to the cross cursor key 232).

Thus, the processing proceeds to step A4, in which the CPU 211 selects one of a plurality of setting items according to a rotation operation on the dial 231 (A4). Then, the CPU 211 continues the selection operation with the operation of rotating the dial 231 until an operation of pressing the dial 231 (A5) is made.

Here, the operations of selecting and determining a setting item is described. It is assumed that presently an item image 20 as shown in FIG. 5 is displayed on the electronic viewfinder 206. The user selects one of a plurality of setting items 21 to 24 by rotating the dial 231 leftward or rightward relative to the camera body 2. The selected setting item (the setting item 24 for ISO rating in FIG. 5) is displayed in gray. More specifically, when the dial 231 is rotated left by the user relative to the camera body 2, an item displayed in gray moves left one by one. Likewise, when the dial 231 is rotated right relative to the camera body 2, an item displayed in gray moves right one by one. Thereafter, when the user presses the dial 231 into the back of the camera body 2, the item displayed in gray is determined as an item for selecting setting information.

In the above-described operation, the CPU 211 receives an operation signal indicating a left rotation, an operation signal indicating a right rotation, or an operation signal indicating a depression from the dial 231, and controls display provided on the electronic viewfinder 206, according to the operation signal.

Figure 10:
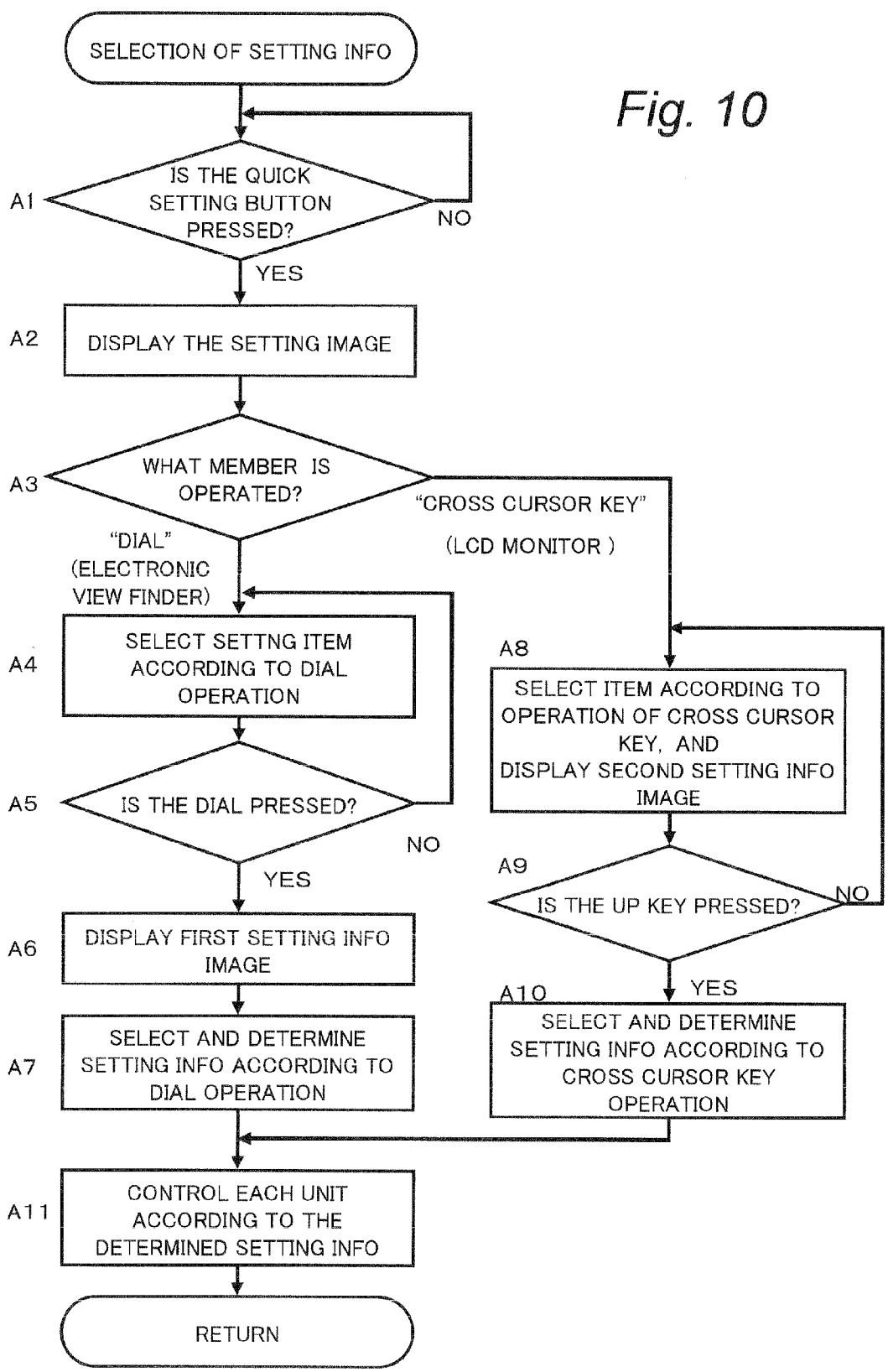
FIG. 10 is a flowchart for describing an exemplary operation of the digital camera 1 according to the first embodiment of the present invention.

Returning to the flowchart in FIG. 10, when one setting item is selected and determined from the item image 20, the CPU 211 displays a first setting information image 31 as shown in FIG. 7 on the electronic viewfinder 206 (A6). Then, the CPU 211 selects one piece of setting information from a plurality of pieces of setting information according to an operation on the dial 231, and makes a setting using the selected setting information (A7).

A method of selecting setting information according to an operation on the dial 231 is the same as the aforementioned method of selecting an item from the item image 20. Specifically, setting information is selected by a rotation of the dial 231 and the selected setting information is determined as setting information to be set by pressing of the dial 231.

The CPU 211 makes settings for each of units of the digital camera 1 based on the thus determined setting information (A11). For example, when the CPU 211 determines "400" as the ISO rating, the CPU 211 sends a control signal for setting the ISO rating to "400", to the CMOS sensor 201. The CMOS sensor 201 adjusts a light-receiving sensitivity of the AGC based on the control signal. With this configuration, settings can be made for the units based on the determined setting information. Those items other than the ISO rating can also be set by the same method.

3.2.2 Case of Setting where Images are Displayed on LCD Monitor

Next, the operations of selecting/determining a setting item and setting information for the case of a setting where images are displayed on the LCD monitor 205 is described.

Figure 11A:
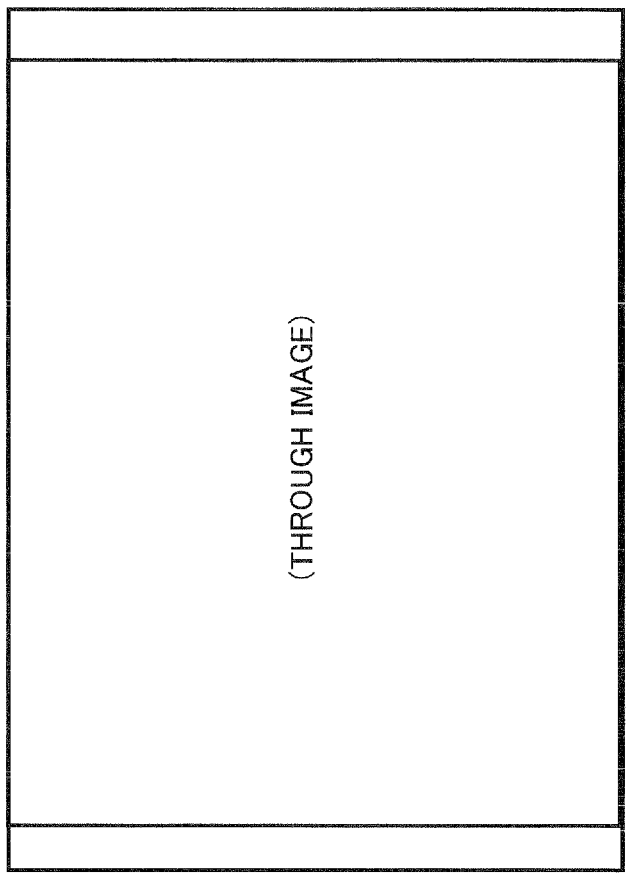
FIGS. 11A and 11B are views showing examples of displayed images according to the first embodiment of the present invention.

The CPU 211 displays, as a through image, image data generated by the CMOS sensor 201 on the LCD monitor 205. Specifically, the CPU 211 sequentially displays image data which is sequentially generated by the CMOS sensor 201, on the LCD monitor 205 (see FIG. 11A).

Figure 11B:
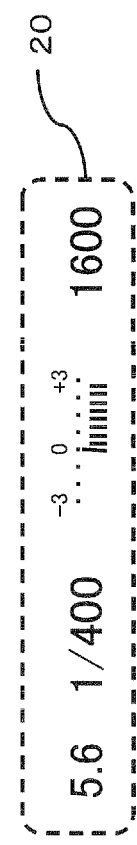

When the CPU 211 receives an operation signal from the quick setting button 230 (A1), the CPU 211 superimposes an item image 20 as shown in FIG. 11B on an image including a through image and displays on the electronic viewfinder 206 (A1).

Figure 12:
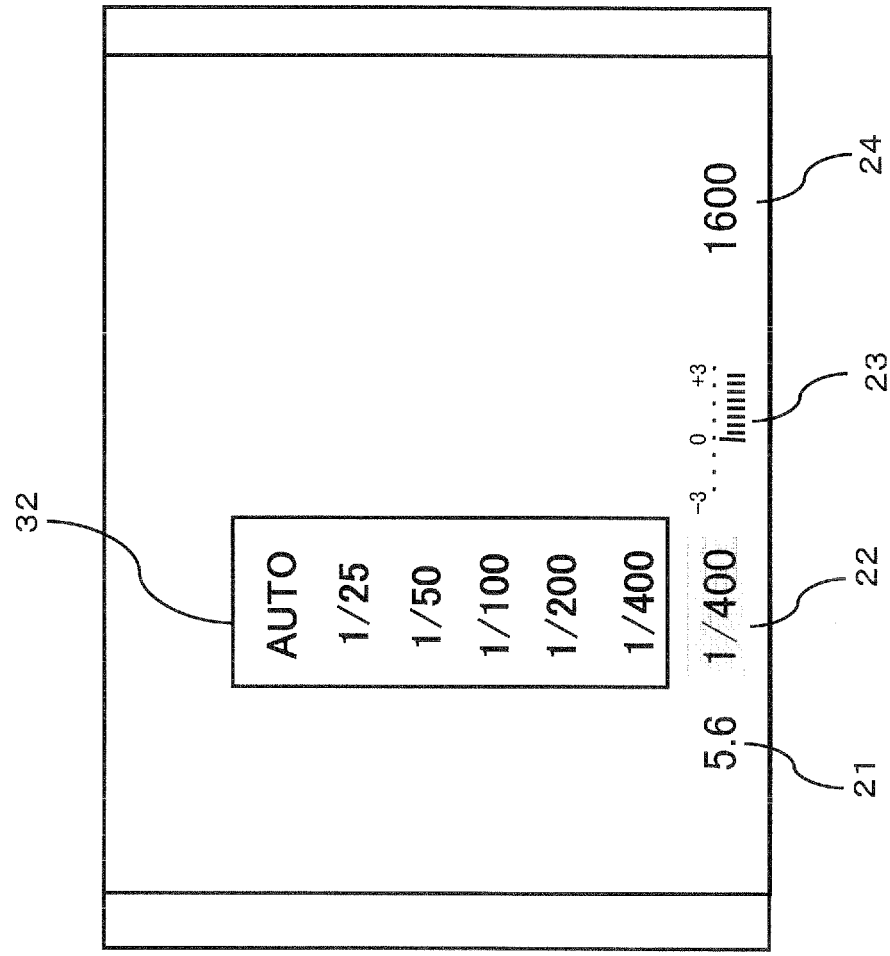
FIG. 12 is a view showing an example of a displayed image according to the first embodiment of the present invention.
Figure 13:
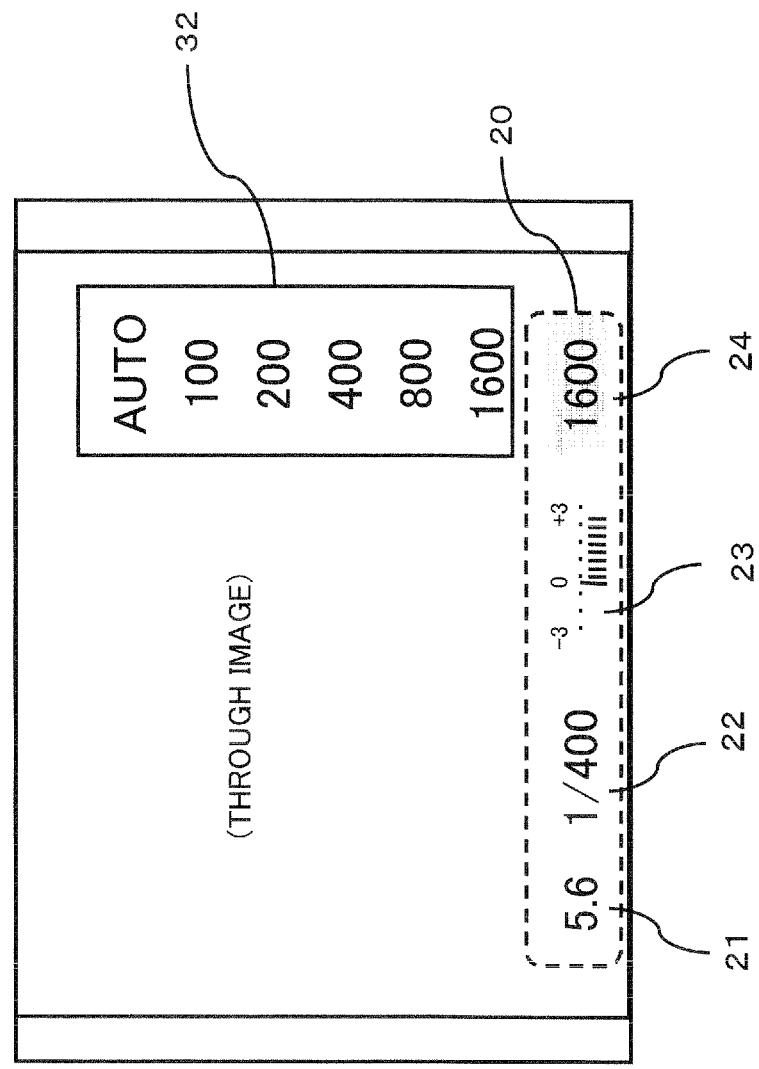
FIG. 13 is a view showing an example of a displayed image according to the first embodiment of the present invention.

The CPU 211 determines whether a member to be operated to select/determine an item and setting information is the dial 231 or the cross cursor key 232 (A3). Here, since the setting is made such that images are displayed on the LCD monitor 205, the member to be operated is the cross cursor key 212. Thus, the processing proceeds to step A8 in which the CPU 211 selects one of a plurality of setting items according to an operation indicating the left-right direction of the cross cursor key 232 (A8). In the present embodiment, a second setting information image corresponding to an item selected from the plurality of setting items is displayed successively. Specifically, when a setting item selected is changed according to an operation in the left-right direction on the cross cursor key 232, a second setting information image related to the changed setting item is displayed. For example, when, as shown in FIG. 13, a setting item 24 for ISO rating is selected, a second setting information image 32 including setting values for the ISO rating is displayed. When, as shown in FIG. 12, a setting item 22 for shutter speed is selected, a second setting information image 32 including setting values related to the shutter speed is displayed. Thereafter, the CPU 211 continues an operation for selecting the setting item until receiving an operation signal indicating the up direction of the cross cursor key 232 (A9).

The operation of selecting and determining a setting item with the cross cursor key 232 is described in detail. It is assumed that presently an item image as shown in FIG. 12 is displayed on the LCD monitor 205. In this case, the user selects one item from a plurality of setting items by pressing the left or right key 23c or 23d of the cross cursor key 232. Specifically, when the user presses the left key 23c of the cross cursor key 232, a setting item displayed in gray moves left one by one. Likewise, when the user presses the right key 23d of the cross cursor key 232, a setting item displayed in gray moves right one by one. At this time, a plurality of pieces of setting information related to the selected setting item are displayed as a second setting information image 32 (see FIG. 13). Thereafter, by user pressing operation of the up key 23a of the cross cursor key 232, transition to a setting information selection operation can be made. Accordingly, when transitioning from a setting item selection to a setting information selection, a transition can be made by a quick operation.

The CPU 211 controls display of the LCD monitor 205 according to an operation signal indicating the left direction, an operation signal indicating the right direction, and an operation signal indicating the up direction from the cross cursor key 232.

Figure 14:
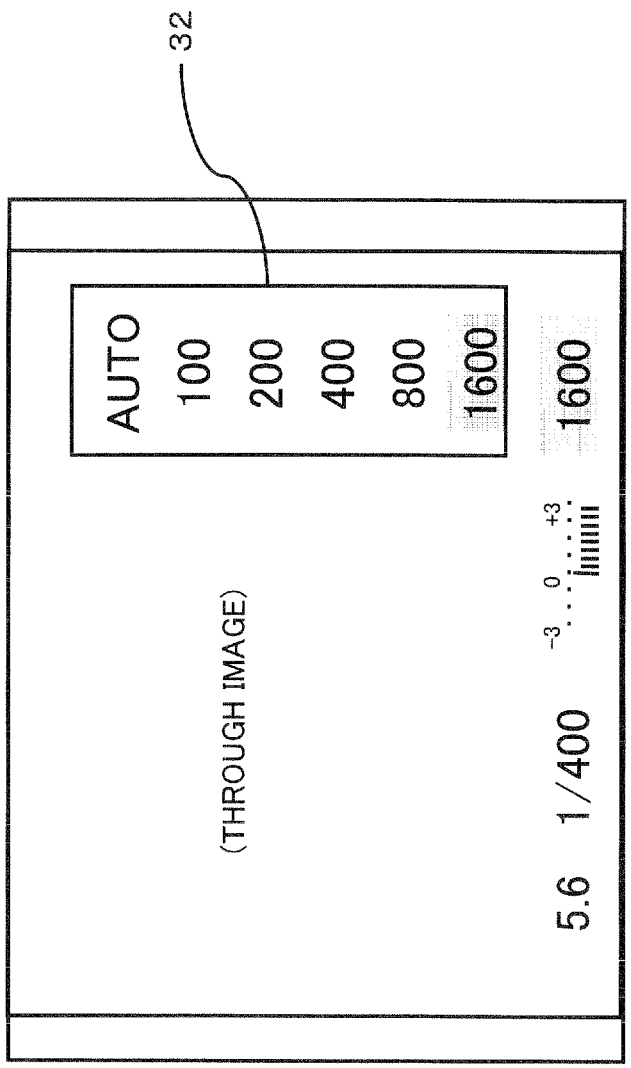
FIG. 14 is a view showing an example of a displayed image according to the first embodiment of the present invention.

When the CPU 211 receives an operation in the up direction on the cross cursor key 232, the CPU 211 displays an image as shown in FIG. 14. Specifically, as shown in FIG. 14, the CPU 211 displays in gray one ("1600" in FIG. 14) of plural pieces of setting information shown in a setting information image 32. The CPU 211 selects and sets one of the plural pieces of setting information according to an up or down operation on the cross cursor key 232 (A10).

Next, a setting information selection operation is described. It is assumed that presently, as shown in FIG. 14, a setting information image 32 is displayed on the LCD monitor 205. The user selects one of plural pieces of setting information by pressing the up or down key 23a or 23b of the cross cursor key 232. Specifically, when the user presses the up key 23a of the cross cursor key 232, setting information displayed in gray moves up one by one. Likewise, when the user presses the down key 23b of the cross cursor key 232, setting information displayed in gray moves down one by one. Thereafter, when the user presses the center key 23e of the cross cursor key 232, the setting information displayed in gray is determined as setting information to be set for control.

The CPU 211 changes a setting on the digital camera 1 based on the thus set setting information (A11).

4. Summary

The digital camera 1 includes the LCD monitor 205, the electronic viewfinder 206, and the CPU 211 that controls the display of a setting screen for changing various settings on the LCD monitor 205 and the electronic viewfinder 206. The CPU 211 controls the display of a setting information image such that a second setting information image 32 which is displayed on the LCD monitor 205 differs from a first setting information image 31 which is displayed on the electronic viewfinder 206. The setting image information 31 and 32 includes an image in which predetermined setting items and candidates for setting values for the respective setting items are arranged to be selected. The CPU 211 controls the display of the setting image information 31 and 32, such that the types of setting items and candidates for setting values to be displayed are the same between the first setting information image 31 which is displayed on the electronic viewfinder 206 and the second setting information image 32 which is displayed on the LCD monitor 205 but the method of displaying the setting items and the candidates for setting values varies between the first setting information image 31 and the second setting information image 32.

This configuration, upon selecting information, allows the digital camera 1 to display a setting information image according to a display unit on which images are displayed, on the display unit. Accordingly, the user can perform a more intuitive operation.

Although in the present embodiment an available operation member is set according to a display unit that displays images, the operation member does not need to be fixed to the display unit. It is considered that when images are displayed on the electronic viewfinder 206 the user is likely to use the dial 231 in terms of usability, and when images are displayed on the LCD monitor 205 the user is likely to the cross cursor key 232 in terms of usability. Thus, by displaying a setting information image according to a display unit on which images are displayed, on the display unit, an intuitive operation by the user can be achieved naturally, enabling to improve user convenience.

Second Embodiment

1. Outline of a Digital Camera

In the present embodiment, a digital camera 1 has a first and a second mode as operation modes. In the first mode, an operation member to be operated when a setting item and setting information are selected/determined is set to a dial 231. In the second mode, an operation member to be operated when a setting item and setting information are selected/determined is set to a cross cursor key 232. FIG. 15A and FIG. 15B show available operation members in the respective operation modes. Specifically, when the first mode is set, a CPU 211 performs control such that a setting item and setting information are selected according to an operation on the dial 231, as shown in FIG. 15A. On the other hand, when the second mode is set, the CPU 211 performs control such that a setting item and setting information are selected according to an operation on the cross cursor key 232, as shown in FIG. 15B. Furthermore, a setting information image for selecting setting information varies according to the operation mode. Specifically, in the first mode a first setting information image 31 is displayed, and in the second mode a second setting information image 32 is displayed.

An outline of the operations of the digital camera 1 in the first mode and the second mode is described below. It is assumed that images are displayed on a LCD monitor 205.

When the first mode is set, the CPU 211 displays an item image 20 on the LCD monitor 205. When the first mode is set, the CPU 211 selects one of a plurality of setting items according to an operation performed by a user on the dial 231. The digital camera 1 further displays a setting information image including setting information related to the selected setting item, on the LCD monitor 205. That is, since the operation member is the dial 231, a first setting information image 31 is displayed in which a plurality of pieces of setting information are arranged in a left-right direction. When one piece of setting information is selected from the plural pieces of setting information according to an operation in the left-right direction performed by the user on the dial 231, the CPU 211 makes a setting using the selected setting information.

On the other hand, when the second mode is set, one item is selected from a plurality of setting items according to an operation performed by the user on the cross cursor key 232. The digital camera 1 displays a setting information image including setting information related to the selected item, on the LCD monitor 205. That is, since the operation member is the cross cursor key 232, a second setting information image 32 is displayed in which a plurality of pieces of setting information are arranged in an up-down direction of the digital camera 1. When one piece of setting information is selected from the plural pieces of setting information according to an operation in the up-down direction performed by the user on the cross cursor key 232, the digital camera 1 makes a setting using the selected setting information.

As described above, in the present embodiment, an available operation member and a setting information image to be displayed on a display unit vary according to the operation. That is, by associating operation members with setting information images, an intuitive operation by the user is enabled and thus an imaging apparatus with excellent usability can be implemented.

2. Configuration

The configuration of the digital camera 1 in the second embodiment is the same as that in the first embodiment. In the second embodiment, the digital camera 1 can be set to the first mode or the second mode. As described above, the first mode enables a selection of a setting item/setting information by an operation on the dial 231, and the second mode enables a selection of a setting item/setting information by an operation on the cross cursor key 232.

3. Operation 3.1 Mode Setting

Figure 16:
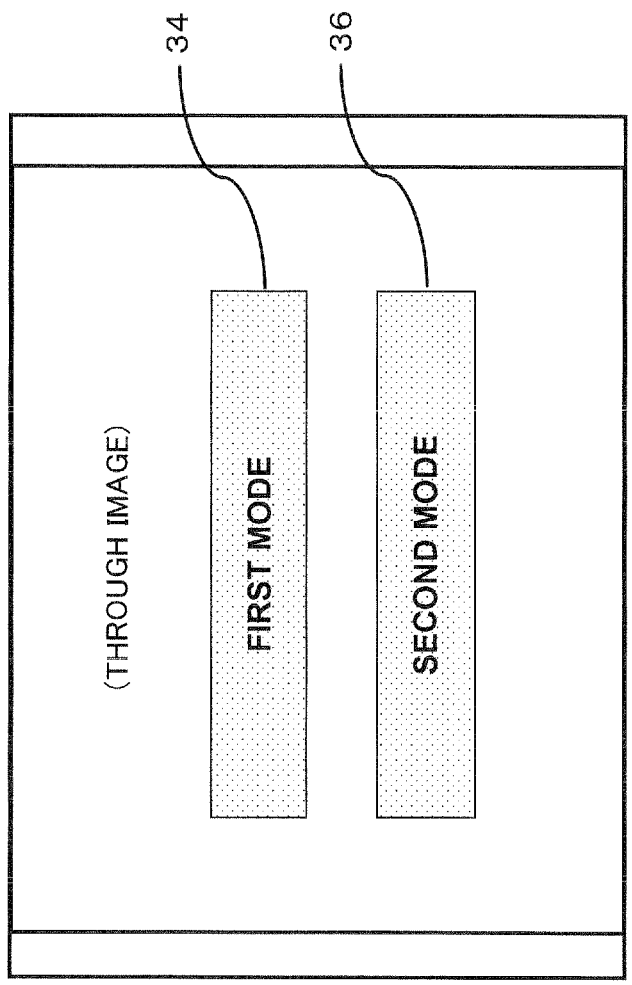
FIG. 16 is a view for describing a first or second mode setting according to the first embodiment of the present invention.

A method of setting the digital camera 1 to the first mode or the second mode is described. First, the CPU 211 displays a mode selection image as shown in FIG. 16 on the LCD monitor 205. The mode selection image can be displayed based on any operation and thus is not limited to the example in the present embodiment. For example, a switch may be provided and a mode selection image may be displayed according to an operation on the switch, or a mode selection image may be displayed at a predetermined timing. In the present embodiment, a mode selection image is displayed by a switch operation and thus a display mode switching button 236 is provided on the back of the digital camera 1.

The mode selection image shown in FIG. 16 includes an icon 34 for selecting the first mode, and an icon 36 for selecting the second mode. The CPU 211 determines an operation mode based on the icon 36 selected according to an operation performed by the user on the cross cursor key 232. Specifically, the CPU 211 selects the first mode or the second mode according to an operation performed by the user on an up or down key 23a or 23b of the cross cursor key 232. Thereafter, when a center switch 23e is operated by the user, the selected mode is determined. The CPU 211 stores information about the determined mode in a flash memory 209, as mode information.

3.2 Setting of Setting Information

Figure 17:
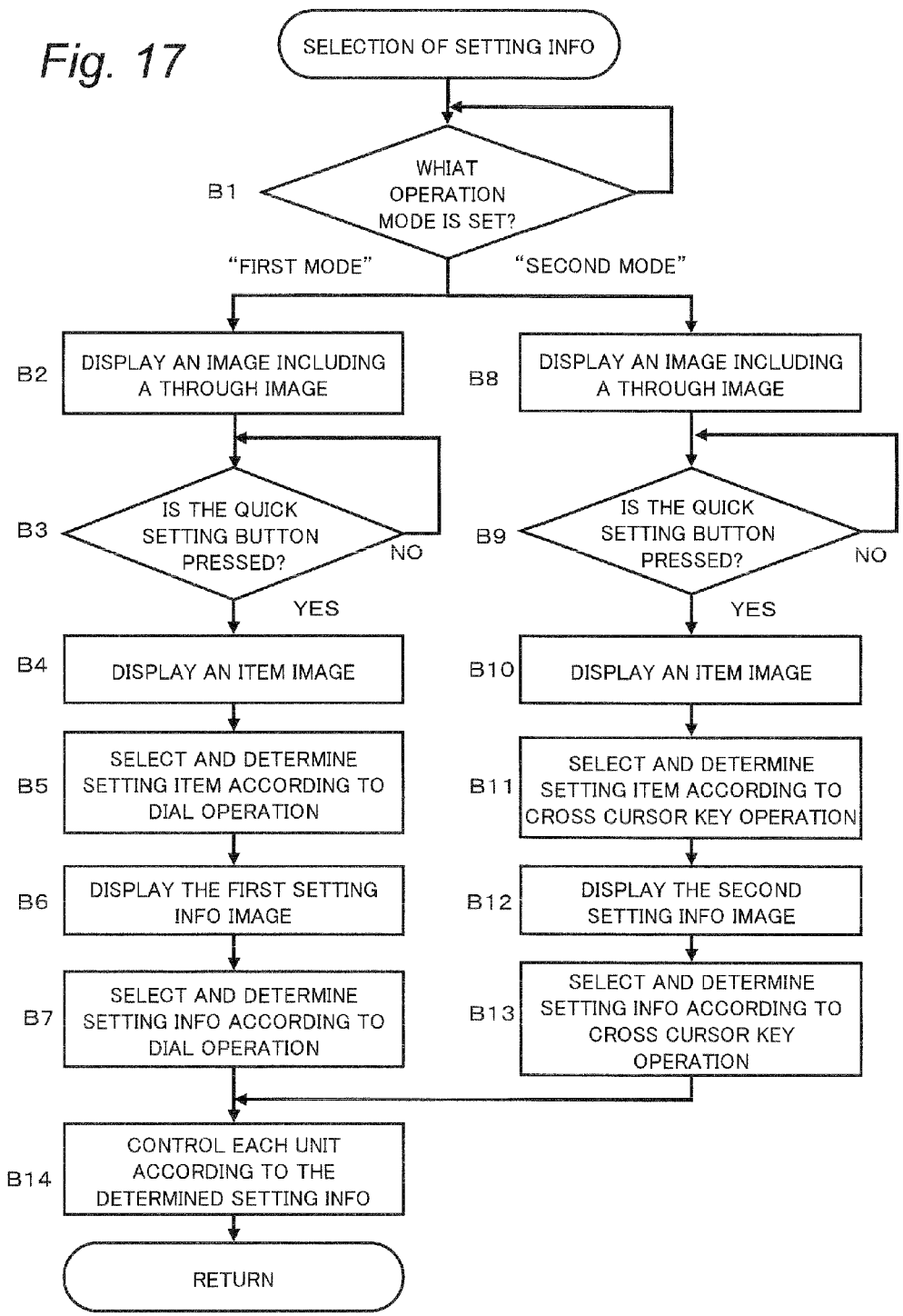
FIG. 17 is a flowchart for describing an exemplary operation of a digital camera 1 according to the second embodiment of the present invention.

An example of a setting operation for setting information in the digital camera 1 of the present embodiment is described with reference to a flowchart in FIG. 17. An exemplary operation for the case in which the digital camera 1 is set to "still image recording mode" is described below. Although in the following the setting is made such that images are displayed on the LCD monitor 205, the operation is also the same as the case in which images are displayed on a viewfinder 206.

The CPU 211 determines whether the current operation mode is the first mode (B1). The determination is made by reading mode information stored in the flash memory 209.

Figure 18A:
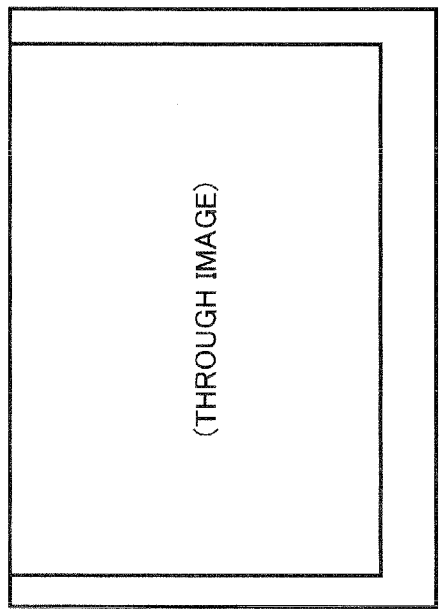
FIGS. 18A and 18B are views showing examples of displayed images according to the second embodiment of the present invention.

If the current operation mode is the first mode, then the processing proceeds to step B2. In step 22, the CPU 211 sequentially displays, as a through image, image data which is sequentially generated by a CMOS sensor 201, on the LCD monitor 205 (see FIG. 18A).

Figure 18B:
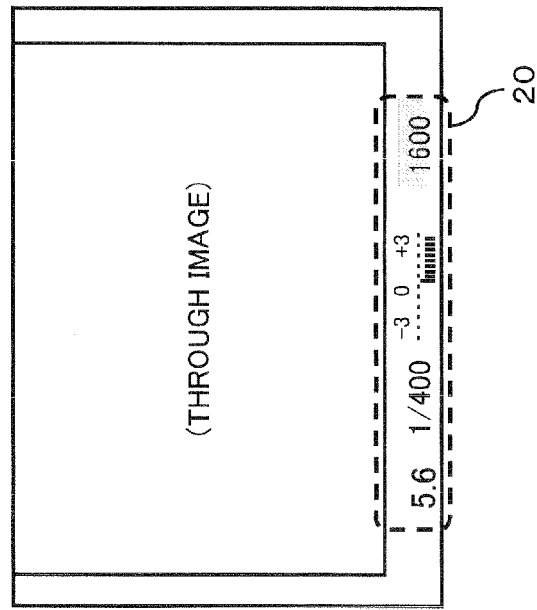

Thereafter, when the CPU 211 receives an operation signal from a quick setting button 230 (B3), the CPU 211 superimposes the item image 20 on an image including a through image and displays it on the LCD monitor 205 (B4) (see FIG. 18B).

The CPU 211 selects and determines one of a plurality of setting items shown in the item image 20 according to an operation performed by the user on the dial 231 (B5). That is, the CPU 211 selects one item according to a rotation operation on the dial 231. The CPU 211 displays in gray the selected item so that the selected item can be distinguished from those items not selected. By pressing operation on the dial 231, the CPU 211 determines the selected item as the finally selected item.

In this manner, the CPU 211 controls display of the LCD monitor 205 according to an operation indicating a left rotation, an operation signal indicating a right rotation, and an operation signal indicating a press, which are sent from the dial 231.

Figure 19A:
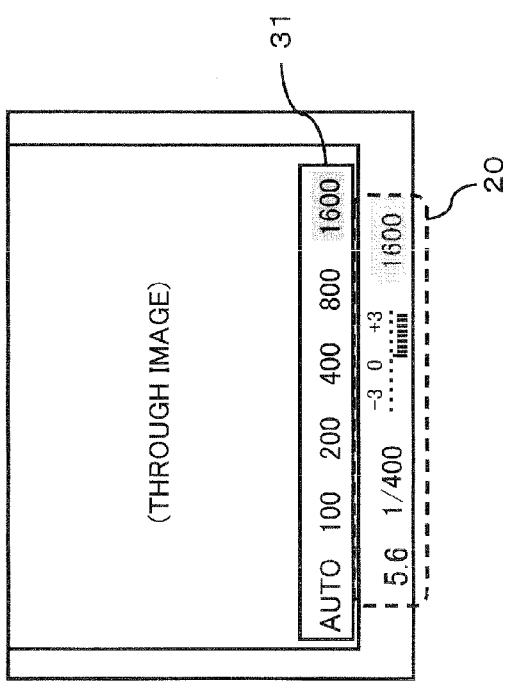
FIGS. 19A and 19B are views showing examples of displayed images according to the second embodiment of the present invention.

When the CPU 211 determines an item, the CPU 211 displays a first setting information image 31 on the LCD monitor 205 (B6), as shown in FIG. 19A. The CPU 211 selects one of a plurality of pieces of setting information according to an operation on the dial 231, and sets the selected setting information on the apparatus (B7). The CPU 211 selects setting information according to a rotation operation on the dial 231, and determines the selected setting information as the finally selected setting information according to a pressing operation on the dial 231. The CPU 211 makes a setting on the digital camera 1 based on the thus determined setting information (B14).

On the other hand, if the current operation mode is the second mode, then the processing proceeds to step B8. In step B8, the CPU 211 sequentially displays, as a through image, image data which is sequentially generated by the CMOS sensor 201, on the LCD monitor 205 (B8) (see FIG. 20A). At this time, a method of displaying an image displayed on the LCD monitor 205 (see FIG. 20A) differs from a method of displaying an image displayed in the first mode (see FIG. 18A).

When the CPU 211 receives an operation signal from the quick setting button 230 (B9), the CPU 211 superimposes an item image 20 on an image including a through image and displays it on the LCD monitor 205 (B10), as shown in FIG. 20B.

The CPU 211 selects and determines one of a plurality of items shown in the item image 20 according to an operation on the cross cursor key 232 (B11). That is, the CPU 211 selects one item according to an operation indicating the left-right direction of the cross cursor key 232. Then, the selected item is determined as the finally selected item according to an operation indicating the up direction of the cross cursor key 232.

In this manner, the CPU 211 controls display of the LCD monitor 205 according to an operation signal indicating the left direction, an operation signal indicating the right direction, and an operation signal indicating a press, which are sent from the cross cursor key 232.

Figure 19B:
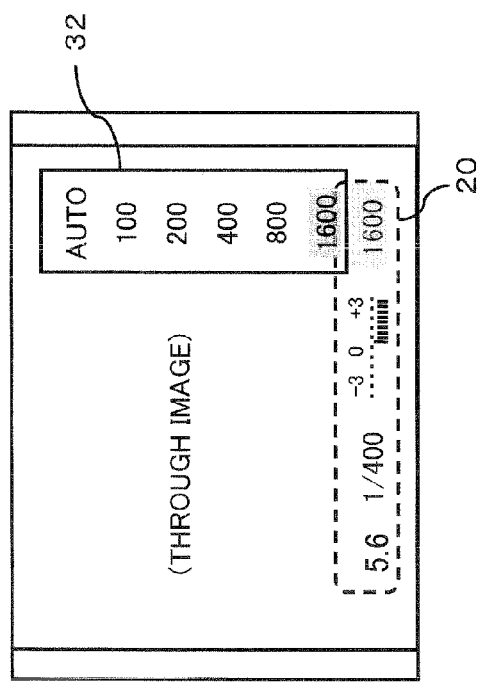

When the CPU 211 determines an item, the CPU 211 displays a second setting information image 32 on the LCD monitor 205 (B12), as shown in FIG. 19B. The CPU 211 selects and determines one of a plurality of pieces of setting information according to an operation on the cross cursor key 232 (B13). Specifically, the CPU 211 selects setting information according to an operation indicating the up-down direction of the cross cursor key 232, and determines the selected setting information as the finally selected setting information according to a pressing operation on the center key 23e of the cross cursor key 232 (an operation indicating determination). The CPU 211 makes a setting on the digital camera 1 based on the thus determined setting information (B14).

As described above, in the present embodiment, by associating operation members with setting information images according to operation modes, an intuitive operation by the user is enabled and thus an imaging apparatus with excellent usability can be implemented.

Third Embodiment

A digital camera of the present embodiment changes setting information images 31 and 32 to be displayed according to an operation member that has been actually operated when a setting item is selected and determined. Specifically, when an operation member having been operated when a setting item is selected and determined is a dial 231, a first setting information image 31 in which setting information is arranged in a left-right direction, is displayed on a LCD monitor 205 or an electronic viewfinder 206. On the other hand, when an operation member having been operated when a setting item is selected and determined is a cross cursor key 232, a second setting information image 32 in which setting information is arranged in an up-down direction, is displayed on the LCD monitor 205 or the electronic viewfinder 206.

Furthermore, the digital camera of the present embodiment sets, as a operation member that can be used for setting information is selected after the determination of a setting item, an operation member which has been operated when the setting item is determined.

FIG. 21 shows a relationship between each operation and an operation member that can be used in each operation in the present embodiment. As shown in the drawing, the dial 231 and the cross cursor key 232 can be used for operations for selection and determination of a setting item. However, regarding operations for selection and determination of setting information, when the dial 231 is used in an operation for determination of a setting item, only the dial 231 can be operated. When the cross cursor key 232 is used in an operation for determination of a setting item, only the cross cursor key 232 can be operated. Specifically, when a member which has been operated for determining a setting item is the dial 231, the dial 231 is set as a member to be operated for selecting the setting information (□ in FIG. 21). On the other hand, when a member which has been operated for determining an item is the cross cursor key 232, the cross cursor key 232 is set as a member to be operated for selecting the setting information (Δ in FIG. 21).

An exemplary operation of a digital camera 1 configured in the above-described manner is described with reference to a flowchart in FIG. 22. In the following, an exemplary operation for the case in which the digital camera 1 is set to "still image recording mode" is described. In addition, it is assumed that the setting is made such that images are displayed on the LCD monitor 205. Description of the same configurations and operations as those in the first embodiment is omitted.

Figure 23B:
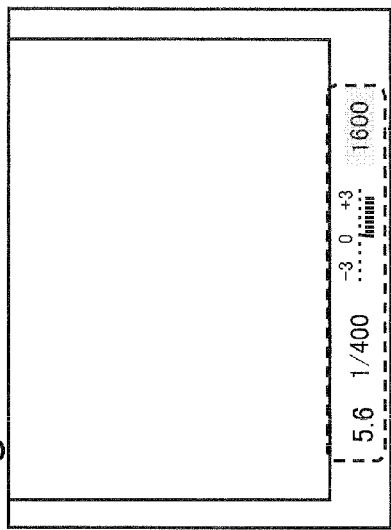
FIGS. 23A to 23D are views for describing examples of displayed screens according to the third embodiment of the present invention.
Figure 23D:
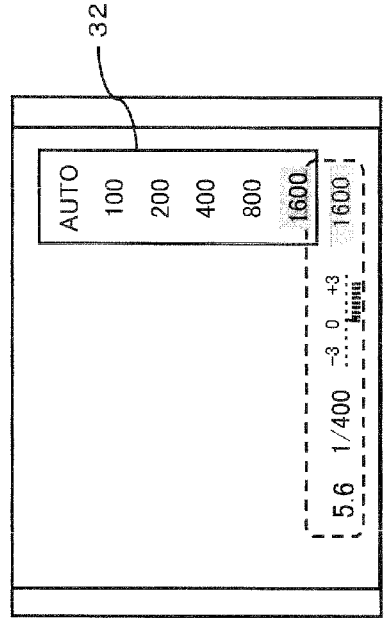
Figure 23A:
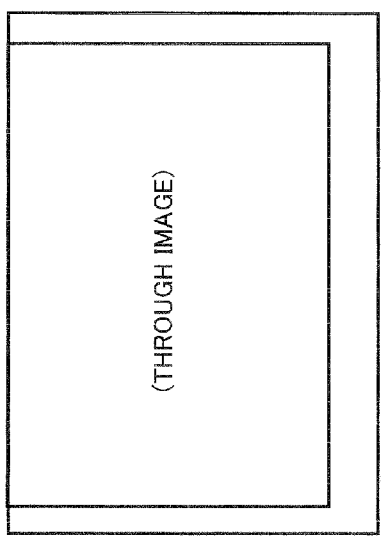

A CPU 211 displays, as a through image, image data generated by a CMOS sensor 201, on the LCD monitor 205 (see FIG. 23A). Specifically, the CPU 211 sequentially displays image data which is sequentially generated by the CMOS sensor 201 on the LCD monitor 205 (C1).

Thereafter, when the CPU 211 receives an operation signal from a quick setting button 230 (C2), the CPU 211 superimposes an item image 20 on an image including a through image and displays it on the LCD monitor 205 (C3), as shown in FIG. 23B.

The CPU 211 selects and determines one of a plurality of setting items shown in the item image 20 according to an operation performed by a user on the dial 231 or the cross cursor key 232 (C4). That is, the CPU 211 selects a setting item according to a rotation operation on the dial 231 or an operation on a left or right key 23c or 23d of the cross cursor key 232. Thereafter, the CPU 211 determines the selected item as the finally selected setting item, according to a pressing operation on the dial 231 or an operation on an up key 23a of the cross cursor key 232.

Figure 23C:
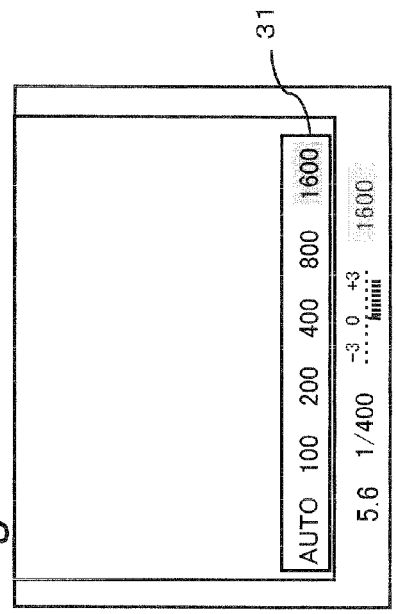

The CPU 211 determines whether the operation member used for determination of a setting item is the dial 231 or the cross cursor key 232 (C5). If the CPU 211 determines that the determination of a setting item is made by the dial 231, then as shown in FIG. 23C, the CPU 211 displays a first setting information image 31 on the LCD monitor 205 (C6). In this case, since the operation direction of the dial 231 is the same as the selection direction in the first setting information image 31, the user can perform an intuitive operation.

Thereafter, the CPU 211 selects and sets one of a plurality of pieces of setting information according to an operation on the dial 231 (C7). Specifically, the CPU 211 selects setting information according to a rotation operation on the dial 231, and determines the setting information according to a pressing operation on the dial 231. The CPU 211 controls components of the digital camera 1 based on the thus determined setting information (C10).

On the other hand, if the CPU 211 determines in step C5 that the determination of a setting item is made by the cross cursor key 232, then as shown in FIG. 23D, the CPU 211 displays a second setting information image 32 on the LCD monitor 205 (C8). In this case, since the operation direction of the cross cursor key 232 is the same as the selection direction in the second setting information image 32, the user can perform an intuitive operation.

Thereafter, the CPU 211 selects and determines one of a plurality of pieces of setting information according to an operation on the cross cursor key 232 (C9). Specifically, the CPU 211 selects setting information according to an operation on the up or down key 23a or 23b of the cross cursor key 232, and determines the setting information according to a pressing operation on a center key 23e of the cross cursor key 232. The CPU 211 controls components of the digital camera 1 based on the thus determined setting information (C10).

As described above, by associating operation members with setting information images, an intuitive operation by the user is enabled and accordingly convenience during a setting operation is improved.

Other Embodiments

The first to third embodiments are exemplified as the embodiments of the present invention. However, the present invention is not limited to such embodiments and can also be implemented in other embodiments. Examples of other embodiments of the present invention are described below.

In the first embodiment, a member that can be used for selecting the setting information varies between the case of displaying a setting information image on the electronic viewfinder 206 and the case of displaying a setting information image on the LCD monitor 205. For example, when an image is displayed on the electronic viewfinder 206, the CPU 211 selects setting information according to an operation on the dial 231. On the other hand, when an image is displayed on the LCD monitor 205, the CPU 211 selects setting information according to an operation on the cross cursor key 232. The associations between display unit and operation member are not limited to the above-described example. For example, when images are displayed on the electronic viewfinder 206, setting information may be selected according to an operation on the cross cursor key 232. When images are displayed on the LCD monitor 205 setting information may be selected according to an operation on the dial 231.

The relationship between each operation in the first mode which is shown in the second embodiment and an operation member that can be used in each operation may be set as shown in FIG. 24. That is, in the first mode, not only the dial 231 but also the cross cursor key 232 may be operated for selection and determination of an item. Specifically, a setting item may be selected according to an operation on the left or right key 23c or 23d of the cross cursor key 232 and the setting item may be determined according to an operation on the center key 23e of the cross cursor key. In this case, a first setting information image 31 may be displayed on the LCD monitor 205 and the like. Furthermore, setting information may be selected according to an operation on the left or right key 23c or 23d of the cross cursor key 232 and the setting information may be determined according to an operation on the center key 23e of the cross cursor key.

In addition, in the above-described embodiments, an organic EL display may be used instead of a LCD monitor.

In the above-described embodiments, description is made using the cross cursor key 232 and the dial 231 as examples of an operation member. As the operation member, in addition to them, a jog dial, a zoom lever, and the like, are considered. That is, any operation member can be used as long as the operation member can send operation signals that indicate the left, right, up, and down directions by the user, to the digital camera 1.

In addition, although in the above-described embodiments a selection from items arranged in the left-right direction is made by a rotation operation in the left-right direction on a dial, a selection from items arranged in the up-down direction may be made by the rotation operation in the left-right direction.

Likewise, a selection from items arranged in the left-right direction or a selection from items arranged in the up-down direction may be made by a rotation operation in the up-down direction on a dial.

Furthermore, although in the above-described embodiments a combination of a dial and a cross cursor key is used as a combination of two operation members, a combination of a dial and a dial, a cross cursor key and a cross cursor key, a dial and left and right keys, or a dial and up and down keys may be used. Alternatively, as two operation members, any two type of members (including a combination of the same type) may be selected from a group including a dial, a cross cursor key, left and right keys, and up and down keys, and the selected ones may be combined.

Although in the first and third embodiments the case is described in which the setting is made such that images are displayed on the LCD monitor 205, the operation is also the same, for the case in which the setting is such that images are displayed on the electronic viewfinder 206.

Switching between the LCD monitor 205 and the electronic viewfinder 206 may be performed using an eye sensor 240. The eye sensor 240 detects whether the user looks through the electronic viewfinder 206. When the user is detected by the eye sensor 240 images may be displayed on the electronic viewfinder 206, and when the user is not detected images may be displayed on the LCD monitor 205.

The above-described embodiments also disclose an imaging apparatus including:

a display unit;

a first operating unit;

a second operating unit; and a controller that controls the display unit such that, when the first operating unit or the second operating unit is operated, a plurality of setting value candidates are displayed for a predetermined setting item in setting items of the imaging apparatus, according to the operation, wherein the controller controls the display unit such that setting items and setting value candidates for the setting items to be displayed are identical between a case of operating the first operating unit and a case of operating the second operating unit, a method of displaying the setting items and the setting value candidates is different between the two cases.

Term Correspondence

The digital camera 1 is an example of an imaging apparatus. The LCD monitor 205 and the electronic viewfinder 206 are examples of a display unit. The CPU 211 is an example of a control unit and a selecting unit. The dial 231 is an example of a first operation member. The cross cursor key 232 is an example of a second operation member.

INDUSTRIAL APPLICABILITY

The present invention can be applied to an information device including a plurality of display units and a plurality of operation members. For example, the present invention can be applied to imaging apparatuses, such as digital cameras, and information display terminals, such as PDAs.

Although the present invention has been described with reference to specific embodiments, many other variants and modifications and other uses are obvious to those skilled in the art. Therefore, the present invention is not limited to the specific disclosure made herein and can only be limited by the appended claims.

DESCRIPTION OF REFERENCE SIGNS

1: DIGITAL CAMERA
2: CAMERA BODY
3: INTERCHANGEABLE TENS
201: CMOS SENSOR
204: BUFFER MEMORY
205: LCD MONITOR
206: ELECTRONIC VIEWFINDER
209: FLASH MEMORY
211: CPU
212: SHUTTER SWITCH
217: DISPLAY SWITCHING UNIT
218: MEMORY CARD
230: QUICK SETTING BUTTON
231: DIAL
232: CROSS CURSOR KEY
234: SELECTION SWITCH
235: MODE SWITCHING DIAL

The invention claimed is:

1. An imaging apparatus comprising:
a first display unit;
a second display unit; and
a controller that controls display of setting screens for changing various settings which are provided on the first and second display units, wherein
the controller controls the display of setting screens so that a setting screen displayed on the first display unit differs from a setting screen displayed on the second display unit,
the setting screen includes an image in which predetermined setting items and candidates for setting values for the respective setting items are arranged, and
the controller controls the display of setting screens so that:
types of a setting item and a candidate for a setting value to be displayed are the same between the setting screen displayed on the first display unit and the setting screen displayed on the second display unit, and
an arranging direction of the setting item is the same in the setting screen displayed on the first display unit and the setting screen displayed on the second display unit, and an arranging direction of the candidate for the setting value differs between the setting screen displayed on the first display unit and the setting screen displayed on the second display unit.

2. The imaging apparatus according to claim 1, further comprising:
a first operating unit which is an operation member that receives a rotation operation in a left-right direction and a pressing operation and outputs a signal corresponding to the operation; and
a second operating unit which is an operation member that receives an operation in an up-down direction and outputs a signal corresponding to the operation.

3. The imaging apparatus according to claim 1, wherein
the setting screen displayed on the first display unit is an image in which the candidates for setting values are arranged in the left-right direction and selectable, and
the setting screen displayed on the second display unit is an image in which the candidates for setting values are arranged in the up-down and selectable.

4. The imaging apparatus according to claim 1, wherein the first display unit has a display device that displays images and is provided inside a main body of the imaging apparatus, and the second display unit has a display device that displays images and is provided outside the main body of the imaging apparatus.

5. The imaging apparatus according to claim 1, wherein the setting item include at least one of aperture value, ISO rating, shutter speed, and white balance.

* * * * *